United States Patent
Nabavi

(10) Patent No.: US 11,173,524 B2
(45) Date of Patent: Nov. 16, 2021

(54) SELF-CLEANING OPTICAL SENSOR ASSEMBLY

(71) Applicant: ExcelSense Technologies Corp., Burnaby (CA)

(72) Inventor: Nima Nabavi, Vancouver (CA)

(73) Assignee: EXCELSENSE TECHNOLOGIES CORP., Burnaby (CA)

( * ) Notice: Subject to any disclaimer, the term of this patent is extended or adjusted under 35 U.S.C. 154(b) by 23 days.

(21) Appl. No.: 16/841,509

(22) Filed: Apr. 6, 2020

(65) Prior Publication Data

US 2020/0230659 A1 Jul. 23, 2020

Related U.S. Application Data

(62) Division of application No. 15/518,899, filed as application No. PCT/CA2015/051044 on Oct. 16, 2015, now Pat. No. 10,632,507.

(Continued)

(51) Int. Cl.
| | |
|---|---|
| *B08B 3/04* | (2006.01) |
| *G02B 27/00* | (2006.01) |
| *B08B 1/04* | (2006.01) |
| *B08B 1/02* | (2006.01) |
| *B08B 1/00* | (2006.01) |
| *H04N 5/217* | (2011.01) |
| *G01N 21/15* | (2006.01) |

(Continued)

(52) U.S. Cl.
CPC ............... *B08B 3/04* (2013.01); *B08B 1/005* (2013.01); *B08B 1/02* (2013.01); *B08B 1/04* (2013.01); *G01N 21/15* (2013.01); *G02B 27/0006* (2013.01); *H04N 5/2171* (2013.01); *B08B 17/00* (2013.01); *G01N 21/8806* (2013.01); *G01N 21/9009* (2013.01); *H04N 5/2251* (2013.01)

(58) Field of Classification Search
CPC ........................................................ B08B 3/04
See application file for complete search history.

(56) References Cited

U.S. PATENT DOCUMENTS

| | | |
|---|---|---|
| 2,912,495 A | 11/1959 | Moon et al. |
| 3,495,366 A | 2/1970 | Allen |
| | (Continued) | |

FOREIGN PATENT DOCUMENTS

| | | |
|---|---|---|
| CA | 2639722 | 3/2010 |
| CN | 101923271 | 12/2010 |
| | (Continued) | |

OTHER PUBLICATIONS

International Search Report issued by the Canadian Intellectual Property Office in connection with the International Patent Application No. PCT/CA2015/051044 dated Dec. 21, 2015, 5 pages.

(Continued)

*Primary Examiner* — Jason Y Ko
(74) *Attorney, Agent, or Firm* — Knobbe Martens Olson & Bear LLP

(57) ABSTRACT

Embodiments of the present disclosure address problems presented by contaminants, such as dirt and debris, by providing an optical apparatus with techniques and methodologies for self-cleaning. In that regard, embodiments of the present disclosure employ techniques and methodologies for maintaining a very thin (e.g., few microns thick) layer of liquid, such as a non-stick liquid, on an optical window of an optical body that shields or protects an optical device.

18 Claims, 29 Drawing Sheets

Related U.S. Application Data

(60) Provisional application No. 62/065,489, filed on Oct. 17, 2014.

(51) Int. Cl.
| | |
|---|---|
| *B08B 17/00* | (2006.01) |
| *G01N 21/90* | (2006.01) |
| *H04N 5/225* | (2006.01) |
| *G01N 21/88* | (2006.01) |

(56) References Cited

U.S. PATENT DOCUMENTS

| | | |
|---|---|---|
| 3,704,481 A | 12/1972 | Fennell |
| 3,776,631 A | 12/1973 | Mammino |
| 3,844,661 A | 10/1974 | Birkett |
| 4,080,685 A | 3/1978 | Vanderpool |
| 4,114,038 A | 9/1978 | Parker |
| 4,667,691 A | 5/1987 | Sasa |
| 4,940,902 A | 7/1990 | Mechalas et al. |
| 5,161,055 A | 11/1992 | Blechschmidt |
| 5,185,531 A | 2/1993 | Wynn |
| 5,313,934 A | 5/1994 | Witta |
| 6,317,401 B1 | 11/2001 | Masaki et al. |
| 6,427,046 B1 | 7/2002 | Bickford |
| 6,452,672 B1 | 9/2002 | Trainoff |
| 6,527,000 B1 | 3/2003 | Randmae et al. |
| 6,599,618 B1 | 7/2003 | Simmon, Jr. |
| 6,607,606 B2 | 8/2003 | Bronson |
| 6,674,476 B1 | 1/2004 | Suzuki |
| 6,758,605 B1 | 7/2004 | Villemaire et al. |
| 7,145,145 B2 | 12/2006 | Benson |
| 7,426,324 B2 | 9/2008 | Schilling et al. |
| 7,525,662 B2 | 4/2009 | Mannhardt et al. |
| 7,598,978 B2 | 10/2009 | Hasimoto |
| 7,971,304 B2 | 7/2011 | Kida et al. |
| 8,151,396 B2 | 4/2012 | Ikeda |
| 8,400,686 B2 | 3/2013 | Mikajini |
| 8,567,963 B1 | 10/2013 | Criscuolo et al. |
| 2002/0131748 A1 | 9/2002 | Sato |
| 2003/0053806 A1 | 3/2003 | Schneider |
| 2005/0134468 A1 | 6/2005 | Thomas et al. |
| 2005/0168736 A1 | 8/2005 | Slater |
| 2005/0201740 A1 | 9/2005 | Pakalns et al. |
| 2006/0230570 A1 | 10/2006 | Parris |
| 2007/0206942 A1 | 9/2007 | Gyde Heaven et al. |
| 2007/0217782 A1 | 9/2007 | McCutchen et al. |
| 2008/0170844 A1 | 7/2008 | Samuel |
| 2009/0201413 A1 | 8/2009 | Fishman |
| 2009/0255845 A1 | 10/2009 | Beitman |
| 2010/0071150 A1 | 3/2010 | Kereth |
| 2011/0023885 A1 | 2/2011 | Vazales et al. |
| 2011/0249965 A1 | 10/2011 | Appel et al. |
| 2012/0000024 A1 | 1/2012 | Layton |
| 2012/0019940 A1 | 1/2012 | Lu et al. |
| 2012/0087647 A1 | 4/2012 | Srivatsan et al. |
| 2012/0133768 A1 | 5/2012 | Stephan |
| 2012/0243093 A1 | 9/2012 | Tonar et al. |
| 2013/0048022 A1 | 2/2013 | Roine et al. |
| 2013/0062228 A1 | 3/2013 | Danilov |
| 2013/0086765 A1 | 4/2013 | Chen |
| 2013/0104933 A1 | 5/2013 | Aldred et al. |
| 2013/0136436 A1 | 5/2013 | Yoshino et al. |
| 2013/0146577 A1 | 6/2013 | Haig et al. |
| 2013/0250403 A1 | 9/2013 | Maeda |
| 2014/0000651 A1 | 1/2014 | Clark |
| 2014/0036132 A1 | 2/2014 | Pawlowski |
| 2014/0186613 A1 | 7/2014 | Liang et al. |

FOREIGN PATENT DOCUMENTS

| | | |
|---|---|---|
| CN | 102586075 | 7/2012 |
| CN | 202815389 | 3/2013 |
| CN | 103291484 | 9/2013 |
| CN | 2588412 | 11/2013 |
| EP | 2353940 | 8/2011 |
| FR | 2690635 | 11/1993 |
| GB | 1242621 | 8/1971 |
| JP | 2002143753 | 5/2002 |
| WO | WO0125153 | 4/2001 |
| WO | WO2001025153 | 4/2001 |
| WO | WO2008033008 | 3/2008 |
| WO | WO2008141874 | 11/2008 |
| WO | WO2012117235 | 9/2012 |
| WO | WO2013086578 | 6/2013 |
| WO | WO2013152402 | 10/2013 |
| WO | WO2013186008 | 12/2013 |
| WO | WO201406500 | 1/2014 |
| WO | WO2014012079 | 1/2014 |
| WO | WO2014060023 | 4/2014 |
| WO | WO2014111498 | 7/2014 |

OTHER PUBLICATIONS

Written Opinion of the International Searching Authority issued by the Canadian Intellectual Property Office in connection with the International Patent Application No. PCT/CA2015/051044, dated Dec. 21, 2015, 8 pages.

Zwerger, Markus, European Patent Office, Extended European Search Report, in connection with related European Patent Application No. 15850651.9, dated May 9, 2018, 11 pages.

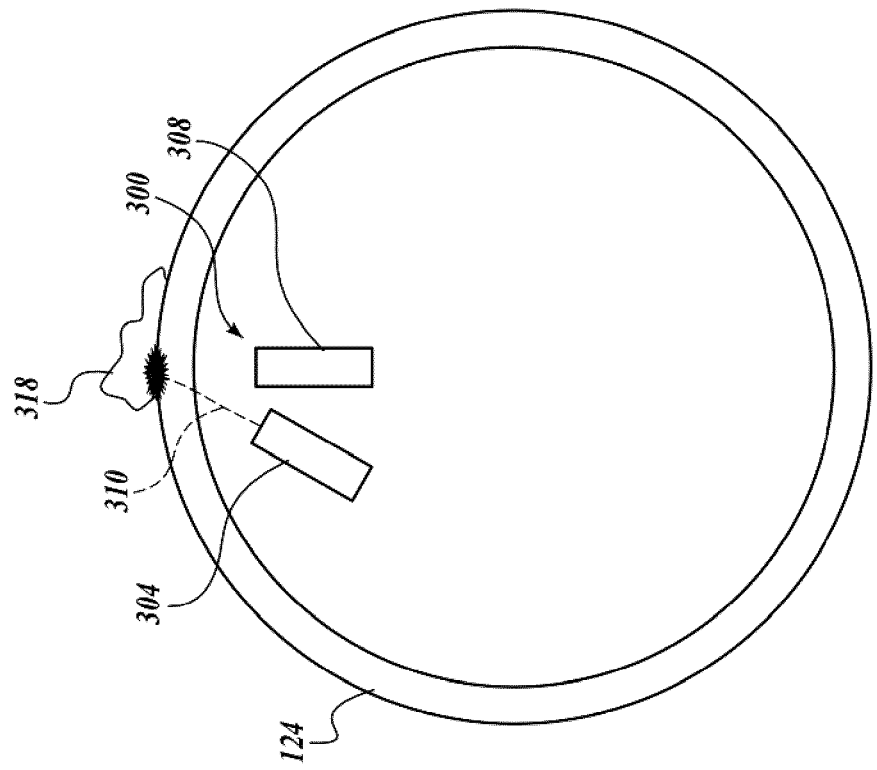
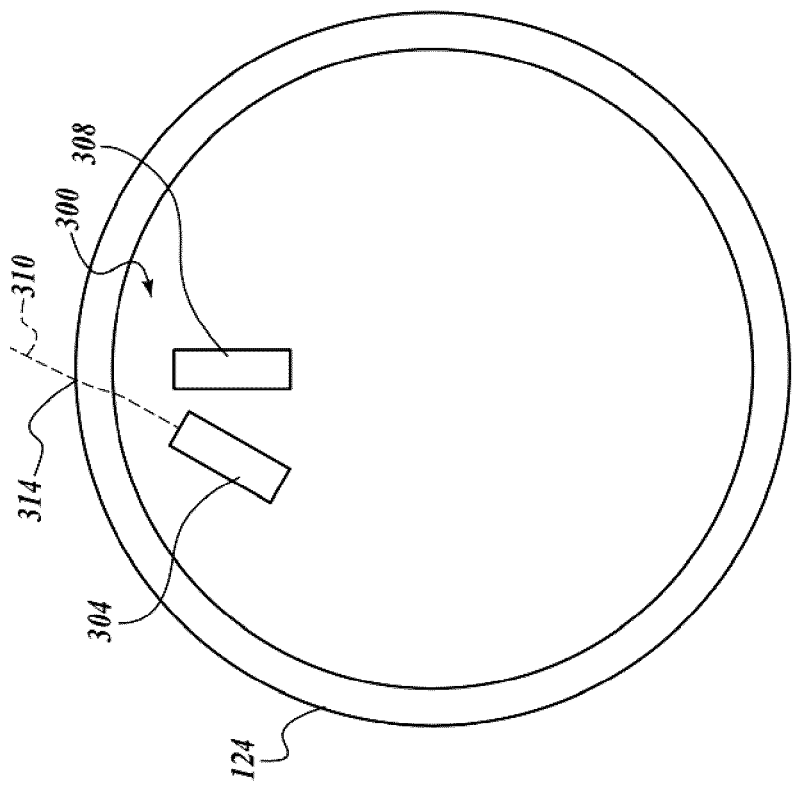

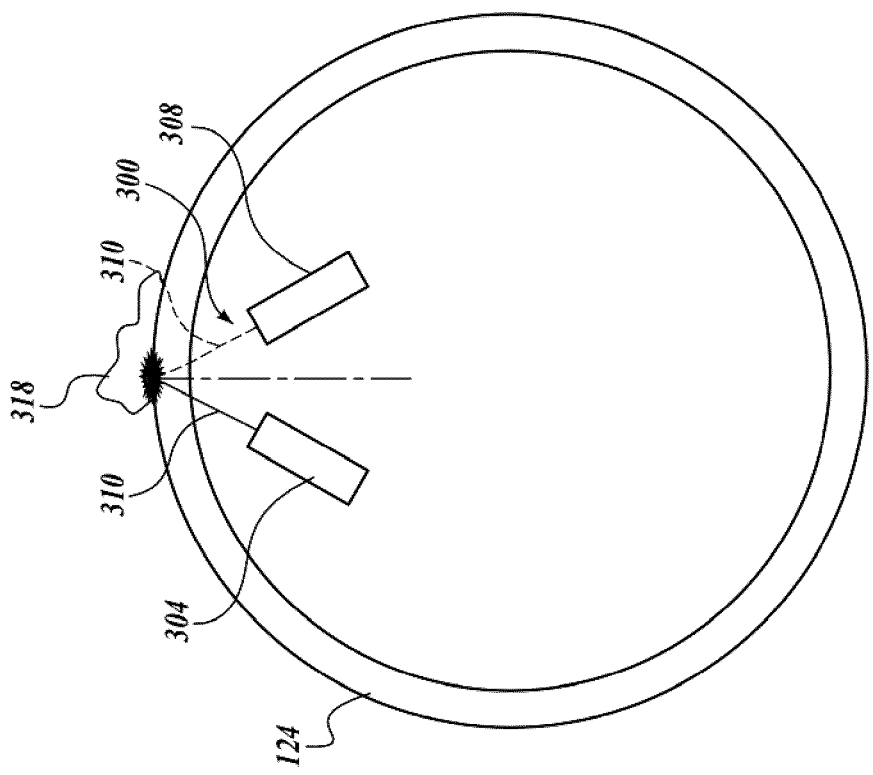
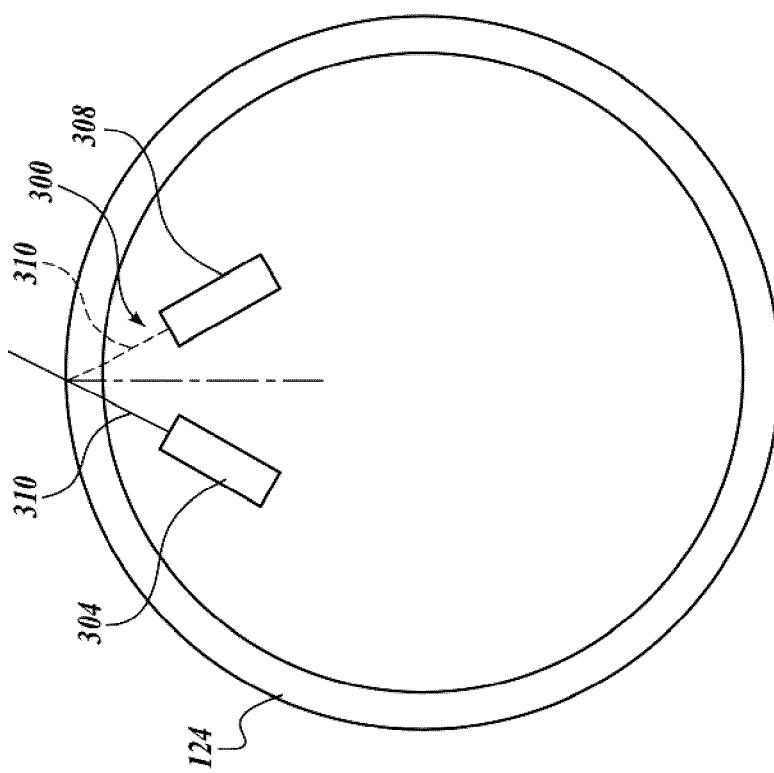

SELF-CLEANING OPTICAL SENSOR ASSEMBLY

FIELD OF THE DISCLOSURE

The present disclosure is directed to an assembly or system which enables an optical device, such as an electro-optical sensor, a photoelectric sensor, an image sensor, a light sensor, a camera, an optical emitter, an optical detector, etc., to self-clean in dirty environments.

BACKGROUND

There is an ever-increasing demand for performing vision-based sensing in heavy duty industries. In these environments, a transparent cover or optical window is typically employed to protect the vision-based sensor during use. In order to maintain reliable performance, it is important that the outer surface of the optical window remain clean and free of dirt, debris or other contamination. Unfortunately, their employment in dirty environments, such as oil, material handling, mining, construction and forestry industries, make them susceptible to contamination and fouling thereby. In some instances, the contamination can, for example, cause a deterioration of performance over time due to dirt and smudge accumulating on the optical window. The situation is worsened when the dirty environment is coupled with an installation location which is hard to reach or doing so would require shutting down the operation.

SUMMARY

Embodiments of the present disclosure address problems presented by contaminants, such as dirt and debris, by providing an optical apparatus with techniques and methodologies for self-cleaning. In that regard, embodiments of the present disclosure employ techniques and methodologies for maintaining a very thin (e.g., a few microns thick) layer or film of liquid, such as a non-stick liquid, on an optical window of an optical body that shields or protects an optical device. In one embodiment, the layer of liquid is thinner than the surface roughness of the optical body, and has a low vapor pressure leading to a low evaporation rate to ensure that it lasts on the surface between self-cleaning cycles.

During service, contaminants land on the thin liquid layer or film covering the optical window of the optical body. Based on a preselected time, an external command, or in response to an output of a dirt/debris sensor, a cleaning cycle is initiated to clean the optical window. The cleaning cycle involves in one embodiment the reciprocating motion of the optical body, either rotationally or linearly, the results of which include a thin film of fluid dispensed onto the optical window by a fluid applicator. In one embodiment, the cleaning cycle involves the reciprocating motion of the optical body, either rotationally or linearly, into and out of fluid contact with a fluid applicator as will be explained below.

The fluid applicator is some embodiments include a fluid chamber that holds the liquid, thereby forming a temporary or permanent fluid reservoir. A wiper is provided, for example, at the opening of the fluid chamber. The wiper is configured to clean the optical window by, for example, scraping or wiping away contaminants that have landed on the optical surface during use. A seal or the like is employed in some embodiments against the moving optical window in order to contain the liquid within the fluid chamber and to prevent leakage thereof. In some embodiments, the seal or the like, together with the fluid chamber, form the fluid applicator. In this regard, the seal can also function to help form or maintain a thin layer of liquid on at least the optical window of the optical body.

To clean the optical window, the optical body is moved in a first direction with respect to the fluid applicator from a first or home position to a second position. In one embodiment, at least a portion of the optical body containing the optical window moves into the fluid chamber. As the optical body moves in the first direction, the wiper removes the contaminants with ease as the liquid, such as non-stick film in some embodiments, has impeded the adhesion of the contaminants to the exterior surface of the optical window. Continued movement of the cleaned optical window in the first direction causes the optical window to be exposed to and in contact with the liquid contained within the fluid chamber.

Next, the optical window is moved in a second direction opposite the first direction from the second position to the home position. As the optical window is moved to the home position, a thin liquid film or layer remains on the exterior surface of the optical window.

Such a methodology is effective against removing hard to wipe and thick grease- and oil-based contaminants as well as dirt, dust and debris. The combination of the thin liquid layer or film with a dedicated wiper ensures reliable scraping of external matter from the optical window. In some embodiments, such combination also prevents the liquid contained in the fluid chamber from getting contaminated.

In accordance with an aspect of the present disclosure, an optical assembly is provided. The optical assembly includes an optical body having an optical window and an optical device protected by the optical body. The optical device is configured with a line of sight corresponding to the optical window. The optical assembly also includes a fluid applicator associated with the optical body. The fluid applicator is configured to apply a layer of liquid over at least the optical window of the optical body. The optical assembly also includes a wiper associated with the optical body. The wiper is configured to remove contaminants from the optical window that land onto the layer of liquid. The optical assembly further includes at least one actuator configured to move one of: (1) the optical body; and (2) the fluid applicator and wiper, through a cleaning cycle comprised of a first stage, wherein the wiper removes the layer of liquid from the optical window of the optical body, and a second, subsequent stage, wherein the fluid applicator applies a layer of liquid onto at least the optical window.

In some embodiments, the optical body is an optical cylinder. In other embodiments, the optical body is an optical plate. In some of these embodiments, the optical plate is disk shaped. In yet other of these embodiments, the optical plate is rectangular shaped. The optical plates each include a planar optical surface.

In some embodiments, the least one actuator is configured to move the one of: (1) the optical body; and (2) the fluid applicator and wiper, in a linearly reciprocating manner.

In some embodiments, the least one actuator is configured to move the one of: (1) the optical body; and (2) the fluid applicator and wiper, in a rotationally reciprocating manner.

In some embodiments, the at least one actuator is configured to move the one of: (1) the optical body; and (2) the fluid applicator and wiper, in a linearly reciprocating manner, a rotationally reciprocating manner, or a continuously rotational manner.

In some embodiments, the optical assembly additionally or alternatively includes one or more controllers configured to control the at least one actuator.

In some embodiments, the optical assembly additionally or alternatively includes one or more sensors coupled in communication with the one or more controllers.

In some of these embodiments, the one or more sensors include a contaminant presence sensor configured to detect the presence of contaminants on the optical window.

In some of these embodiments, the one or more sensors includes a position sensor configured to generate a signal indicate of optical body position.

In some embodiments, the optical assembly additionally or alternatively includes a liquid storage source configured to store the liquid.

In some of these embodiments, the one or more sensors include a liquid level sensor configured to detect the level of liquid contained in the liquid storage source.

In some embodiments, the liquid storage source includes a removable fluid cartridge.

In some embodiments, the fluid applicator includes a fluid chamber configured to hold a predetermined amount of liquid.

In some embodiments, the optical assembly alternatively or additionally includes a liquid storage source configured to store the liquid. The fluid applicator includes a fluid chamber coupled in liquid communication with the liquid storage source.

In some embodiments, the optical assembly alternatively or additionally includes a first fluid line connecting the fluid chamber to the liquid storage source, a second fluid line connecting the fluid chamber to the liquid storage source, a first check valve coupled to the first fluid line, the first check valve configured to allow liquid flow from fluid reservoir to the liquid storage source and to prevent liquid flow from the liquid storage source to the fluid chamber, and a second check valve coupled to the second fluid line, the second check valve configured to allow liquid flow from the liquid storage source to the fluid chamber and to prevent liquid flow from the fluid chamber to liquid storage source.

In some embodiments, the optical assembly alternatively or additionally includes a filter coupled in liquid communication with the first fluid line between the first check valve and the liquid storage source such that liquid passing through the first check valve passes through the filter before entering the liquid storage source.

In some embodiments, the actuator is configured to impart linear reciprocating movement to the optical body. In other embodiments, the actuator is configured to impart linear reciprocating movement to the fluid applicator and the wiper.

In some embodiments, the actuator includes at least one lead screw mechanism each composed of an electric motor, a lead screw, and a lead screw nut.

In some embodiments, each lead screw nut fixed against rotation.

In some embodiments, the optical assembly alternatively or additionally includes a fluid cylinder, wherein the optical body is configured to reciprocate into at least a portion of the fluid cylinder.

In some embodiments, the optical assembly alternatively or additionally includes a piston sealable associated with the fluid cylinder.

In some embodiments, the piston is coupled to at least a part of the actuator for movement therewith.

In some embodiments, the fluid applicator further includes a primary seal disposed between the interior surface of the fluid cylinder and the exterior surface of the optical body, thereby forming a fluid chamber.

In some embodiments, the wiper is disposed adjacent the primary seal.

In some embodiments, the liquid includes a non-stick liquid.

In accordance with another aspect of the present disclosure, an optical assembly is provided. The optical assembly includes an optical body having an optical window, an optical device protected by the optical body, an optical body cleaning mechanism configured to clean an outer surface of the optical body, a driving mechanism configured to impart movement to the optical body with respect to optical body cleaning mechanism between a first position and a second position, and a fluid dispensing mechanism configured to apply a layer or film of a non-stick liquid onto the optical body. The optical body cleaning mechanism cleans the outer surface of the optical body and the cleaning fluid dispensing mechanism applies a layer of non-stick liquid to the optical body as the driving mechanism cycles the optical body from the first position to the second position and then to the first position.

In some embodiments, the driving mechanism is configured to impart linearly reciprocating movement to the optical body. In other embodiments, the driving mechanism is configured to impart rotationally reciprocating movement to the optical body. In yet other embodiments, the driving mechanism is configured to impart a rotational movement to the optical body.

In some embodiments, the optical body cleaning mechanism cleans the outer surface of the optical body as the driving mechanism moves the optical body from the first position to the second position and the cleaning fluid dispensing mechanism forms a layer of non-stick liquid on the optical body as the driving mechanism moves the optical body from the second position to the first position.

In accordance with another aspect of the present disclosure, a fluid circuit is provided for an optical assembly. The optical assembly includes a fluid chamber, a liquid source, a first fluid line connecting the fluid chamber to the liquid source, a second fluid line connecting the fluid chamber to the liquid source, a first check valve coupled to the first fluid line, the first check valve configured to allow liquid flow from the fluid chamber to the liquid source and to prevent liquid flow from the liquid source to the fluid chamber, and a second check valve coupled to the second fluid line, the second check valve configured to allow liquid flow from the liquid source to the fluid chamber and to prevent liquid flow from the fluid chamber to the liquid source.

In some embodiments, the fluid circuit alternatively or additionally includes a filter coupled in liquid communication with the first fluid line between the first check valve and the liquid source such that liquid passing through the first check valve passes through the filter before entering the liquid source.

In some embodiments, the fluid circuit alternatively or additionally includes a second fluid chamber and a third fluid line connecting the second fluid chamber to the liquid source.

In some embodiments, the third fluid line is coupled in liquid communication with the second fluid line in-between the second check valve and the liquid source.

In accordance with another aspect of the present disclosure, a method is provided for cleaning an optical window of an optical assembly. The method includes applying a layer of liquid onto an optical body that protects an optical device, at least a portion of the optical body forming the optical window, exposing at least the optical window of the optical body to an environment containing dirt or debris, moving the optical body containing the optical window in a first direction with respect to an internal chamber, cleaning the optical body containing the optical window during movement of the optical body but prior to entry into the internal chamber, coating the clean optical body containing the optical window with a layer of liquid contained in the internal chamber; and moving the optical body having a layer of liquid in a second direction opposite the first direction to again expose at least the optical window of the optical body to the environment.

In some embodiments, said moving the optical body containing the optical window in a first direction is responsive to an output of a contamination sensor.

In some embodiments, said moving the optical body containing the optical window in a first direction is responsive to a predetermined elapsed time period.

In accordance with another aspect of the present disclosure, an optical assembly is provided. The optical assembly includes an optical body having an optical window, an optical device protected by the optical body, wherein the optical device is configured with a line of site corresponding to the optical window, means for applying a liquid onto at least the optical window, means for removing contaminants that land onto the layer of liquid, and means for moving one of one or more optical bodies and the means for applying a liquid with respect to the other one of the one or more optical bodies and the means for applying a liquid through a cleaning cycle comprised of a first stage, wherein the means for removing contaminants removes any contaminants that landed onto the layer of liquid along with at least a portion of the liquid layer, and a second stage, wherein the means for applying a liquid applies a layer of liquid onto the optical window.

In some embodiments, the optical assembly alternatively or additionally includes means for sensing contaminants on the optical window.

In some embodiments, the optical assembly alternatively or additionally includes means for determining to move the optical body through the cleaning cycle.

In accordance with another aspect of the present disclosure, an optical assembly is provided that is configured to self-clean an optical window associated with an optical device.

In accordance with another aspect of the present disclosure, an optical assembly is provided. The optical assembly includes an optical body having an optical window, an optical device protected by the optical body, an optical body cleaning mechanism configured to clean an outer surface of the optical body, a fluid applicator positioned adjacent the optical body cleaning mechanism and configured to apply a layer or film of a non-stick liquid onto the optical body, and a driving mechanism configured to impart movement between the optical body and the both the optical body cleaning mechanism and the fluid applicator through a cleaning cycle comprised of a first stage, wherein the optical body cleaning mechanism removes at least some of the contaminants that landed onto the layer of liquid along with at least a portion of the liquid layer, and a second stage, wherein the fluid applicator applies a layer of liquid onto the optical window.

In some embodiments, the optical assembly alternatively or additionally includes a contamination sensor configured to sense contaminants present on the optical window.

In some embodiments, the contamination sensor comprises at least one emitter and at least one detector.

In some embodiments, the contamination sensor comprises a pair of detectors, each detector of the pair of detectors having a different orientation than the other. In one embodiment, one detector is oriented between about 45 degree and 135 degrees with respect to the other. In other embodiments, the angle is between 60 degrees and 120 degrees. In yet other embodiments, the angle is between 75 degrees and 105 degrees. In still other embodiments, the angle is about 90 degrees.

In some embodiments, the driving mechanism is configured to impart movement based on an output of the sensor.

In some embodiments, the optical assembly alternatively or additionally includes one or more controllers, at least one controller in communication with the sensor and at least one controller in communication with the driving mechanism, wherein at least one of the one or more controllers are configured to send control signals to the driving mechanism responsive to signals received from the sensor.

In some embodiments, the at least one of the one or more controllers is configured to compare the output of at least one of the detectors when at least one of the emitters is on against when the at least one emitter is off, and wherein the at least one controller of the one or more controllers is configured to signal the driving mechanism when the difference from the said comparison is larger than a predetermined threshold, said threshold indicating that the optical window has an amount of contaminants in need of removal.

In some embodiments, the fluid applicator includes a fluid chamber configured to hold a predetermined amount of liquid.

In some embodiments, the predetermined amount of liquid is enough to provide for a plurality of cleaning cycles.

In some embodiments, the optical body cleaning mechanism includes a wiping element.

In some embodiments, the optical body cleaning mechanism is configured to wipe or scrape against the outer surface of the optical body.

In some embodiments, the optical assembly alternatively or additionally includes a flexible bellows in fluid communication with the fluid chamber.

In some embodiments, the flexible bellows is connected in fluid communication with the fluid chamber via channels provided in an upper gland that surrounds the optical body.

In some embodiments, the optical assembly alternatively or additionally includes a fluid bladder connected in fluid communication with the fluid chamber.

In some embodiments, the flexible bellows compresses during the second stage of the cleaning cycle.

In some embodiments, the optical body is a spherical body.

In some embodiments, the driving mechanism is configured to move the optical body in one of a linearly reciprocating manner, a rotationally reciprocating manner, and a continuously rotational manner.

In some embodiments, the optical body is an optical cylinder, and wherein the driving mechanism is configured to rotate the optical cylinder about its longitudinal axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 14A and FIG. 14B are schematic representations of one embodiment of a dirt/debris sensor in accordance with an aspect of the present disclosure;

FIG. 15A and FIG. 15B are schematic representations of another embodiment of a dirt/debris sensor in accordance with an aspect of the present disclosure;

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of devices, systems and/or assemblies that protect one or more associated optical devices from moisture, weather, and environmental conditions. In the examples described herein, the device, system and/or assembly includes techniques and methodologies for providing a self-cleaning feature so that the one or more optical devices can continually provide acceptable results (e.g., reception or transmission of optical signals, such as light, electromagnetic energy, etc.) in, for example, dirty environments. As will be described in more detail below, some examples of the self-cleaning feature includes a self-cleaning/wiping mechanism associated with the one or more optical devices.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
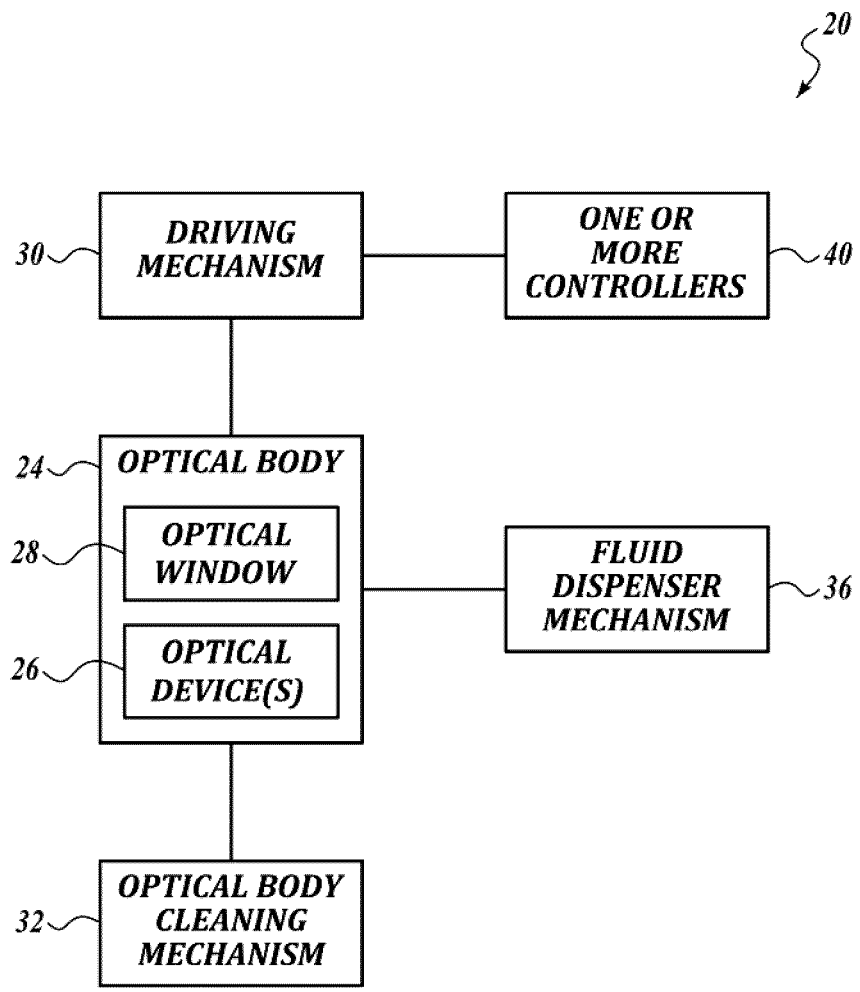
FIG. 1 is a functional block diagram of one embodiment of an optical assembly formed in accordance with an aspect of the present disclosure.

FIG. 1 is a functional block diagram of one example of a self-cleaning optical assembly, generally designated 20, formed in accordance with aspects of the present disclosure. The assembly 20 comprises an optical body 24, a driving mechanism 30, an optical body cleaning mechanism 32, a fluid dispensing mechanism 36, sometimes referred to herein as a fluid applicator, and one or more controllers 40. The optical body 24, such as a transparent plate, a cylinder, a spherical-like plate, or the like, protects at least one interiorly disposed optical device 26 from being damaged by the exterior environment in which it's deployed, and provides an optical window 28 through which light can pass in route to the optical device. At first deployment, and during subsequent cleaning cycles, the fluid dispensing mechanism 36 applies a layer or film of non-stick liquid onto at least the optical window 28 of a clean optical body 24. After periodic use of the optical assembly, a cleaning cycle is initiated by the one or more controllers 40. Once initiated, the optical body cleaning mechanism 32 is used to clean at least the optical window 28, as the driving mechanism 30 moves the optical body 24 with respect to optical body cleaning mechanism 32 or vice versa. As will be described in more detail below, the optical body cleaning mechanism 32 quickly and easily removes the contaminants from the optical window 28 of the optical body 24 as the non-stick film has impeded the adhesion of the contaminants to the exterior surface thereof. To complete the cleaning cycle under control of the one or more controllers 40, the fluid dispensing mechanism 36 again applies a layer or film of the liquid onto the newly cleaned optical window of the optical body 32 and the optical body is returned to its first or home position.

The fluid dispensing mechanism 36, also referred to as a fluid applicator, in the representative embodiments disclosed herein include an applicator body having a fluid chamber with any cross-sectional shape. Optionally provided in the applicator body is at least one inlet for receiving the liquid from a local or remote source. For improved results, the fluid chamber of the applicator body should be entirely filled with the liquid, although acceptable results are achieved with less than a filled fluid chamber. In some embodiments, the applicator body also includes one or more outlets to facilitate recirculation, filtration or drainage of the liquid. In various embodiments, the shape and the location of the outlet can be chosen such that small particles (if any) entering the fluid applicator over-time do not accumulate near the application side but instead exit through the outlet for optional filtration or accumulation away from the applicator.

As described above, the fluid chamber can have any shape. In some embodiments, the shape of the fluid chamber can be advantageously configured so that it discourages trapping of gasses to ensure a complete fill. An example of such a configuration includes the introduction of an angle in the interior upper surface of the fluid chamber to guide the gas bubbles to the inlet or the optional outlet and exteriorly of the applicator. In some embodiments, the angle of installation of the optical assembly in service can be taken into account when designing the shape of the fluid applicator so that any spots within the fluid chamber that are close or in contact with the optical body are not starved out of fluid.

The fluid applicator in the representative embodiments disclosed herein also includes an applicator element. In some embodiments, the applicator element is in the form of a dynamic rod seal. In other embodiments, the applicator element is in the form of a face seal or the like. The face or rod seals could be a type of an O-Ring, an internally lubricated O-Ring, an O-ring energize U-cup or lip seal, a metal spring energized U-cup or lip seal, or other commercially available types of sealing elements suitable for a dynamic face or rod seal configuration. An example of a dynamic rod seal are those sold by Parker Hannifin under the Standard PolyPak family of seals. An example of U-cup face seals with and without energizing elements are those sold by Parker Hannifin under the FlexiSeal family of seals. Alternatively, instead of a face seal, the fluid applicator could include a fluid permeable media such as a media with nano-tubes or a porous elastomer.

When assembled, the face seal is positively compressed between the optical body and the applicator body. The amount of compression can be controlled either by controlling the gap between the applicator and the optical body by, for example, adjusting a screw or machining tolerances, or by controlling the compression force by, for example, adjusting the compression of an associated spring.

The optical body cleaning mechanism 32 in the representative embodiments disclosed herein includes a wiper or wiping element that exhibits a wiping or scrapping action for cleaning the optical window of the optical body 24. In these embodiments, the wiper includes an edge which is in complete contact with, and preferably positively compressed against, the optical body. The amount of wiper compression can be controlled either by controlling the relative location of the wiper with respect to the optical body or by the amount of force applied, for example, via a spring or the like.

The wiper can have a straight, angular, or a curved shape as long as the wiping edge is in complete contact with the optical surface with sufficient compression to ensure that the fouling matter does not cause temporary disengagement of the wiping edge. The wiper can be shaped such that it guides the collected fouling matter away from the optical body as a result of the relative movement between the optical body and the wiper. For example, in the case of a rotating optical surface, introducing an angle to the wiper edge with respect to the radius of the movement can have the effect of driving the fouling matter to the outer periphery of the optical surface. The length of the wiper it typically such that its projection perpendicular to the direction of movement (for a rotating surface, the radial direction) is equal to or slightly larger than the width of the surface effectively wetted by the fluid applicator. Furthermore, in some embodiments, the path of the wiper should be centered with respect to the path of the fluid applicator.

In the following disclosure, a non-stick liquid can be defined as any liquid which possesses the following characteristics:

It is not repelled by the optical surface such that in small amounts it does not bead or readily drip under the force of gravity;
  Its presence on the optical surface allows a weakened bond or no bond to form between the fouling matter and the optical surface;
  It has a tendency to lower friction and mechanical wear such that it reduces the likelihood of the fouling matter scratching the optical surface during the wiping action;
  It remains stable (in its state, viscosity and chemical composition) throughout the expected field temperature range and conditions;
  It remains chemically stable in the presence of expected contaminants such as water, grease and any other field specific contaminants.

Examples of a non-stick liquid that can be practiced with several embodiments disclosed herein include a range of hydraulic oils that are designed to demonstrate anti-wear properties, resist foaming, release air, maintain relatively stable viscosity within the field temperature range, are suitable for filtration, and demonstrate low volatility and hydrolytic stability. An example of such hydraulic oil would be "All Weather Hydraulic 68" produced by Shell, Mobil, Chevron and other major manufacturers. Some hydraulic oils feature an anti-static electricity/anti-magnetic characteristic which may further aid in reducing dust attraction. An example of such oil would be Omega 612 by Omega Corporation. Some oils that can be used have hydrophobic characteristics which may help with quick repelling of water drops. An example of such oil would be DOT5, which is a silicon-based hydraulic oil.

Figure 2:
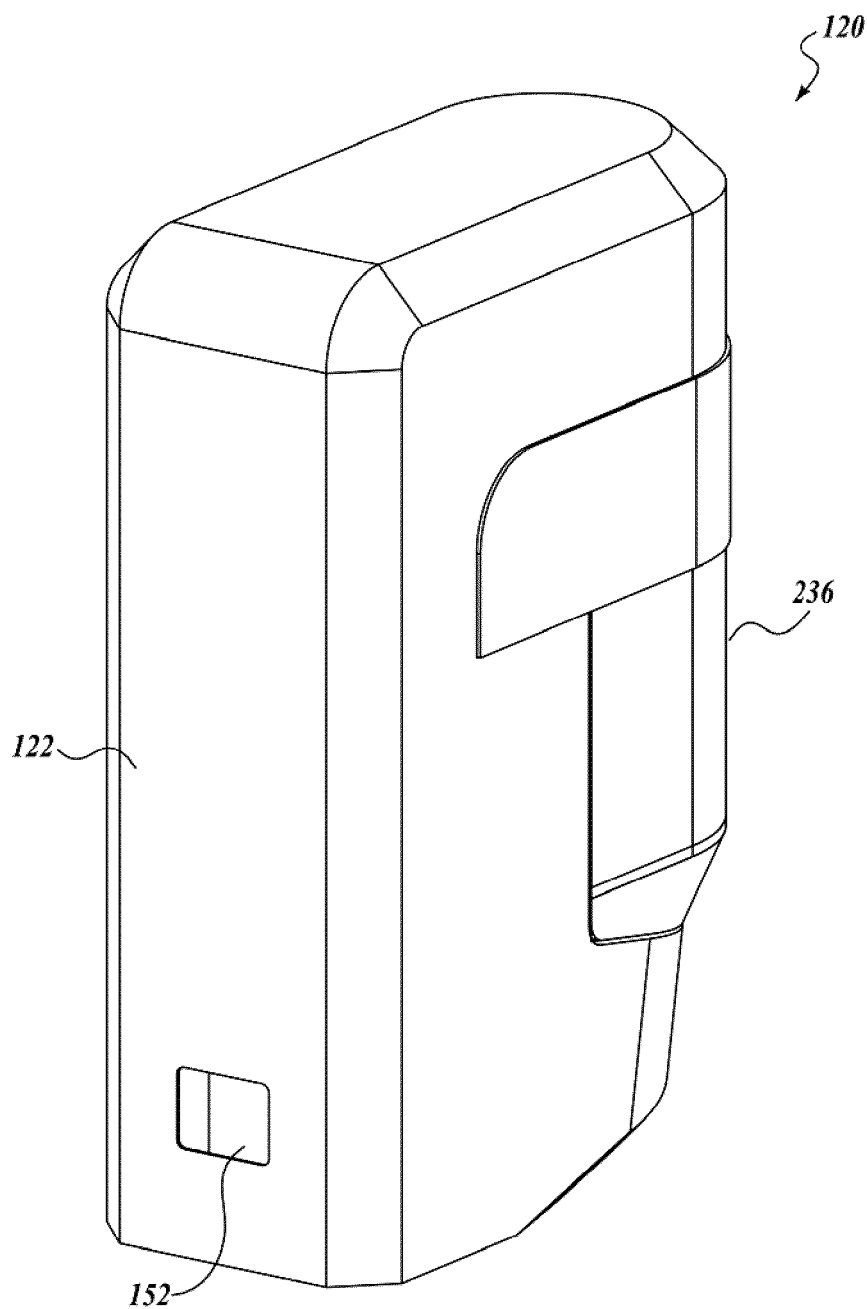
FIG. 2 is a perspective view of one representative embodiment of the optical assembly depicted in block diagrammatic form in FIG. 1.
Figure 3:
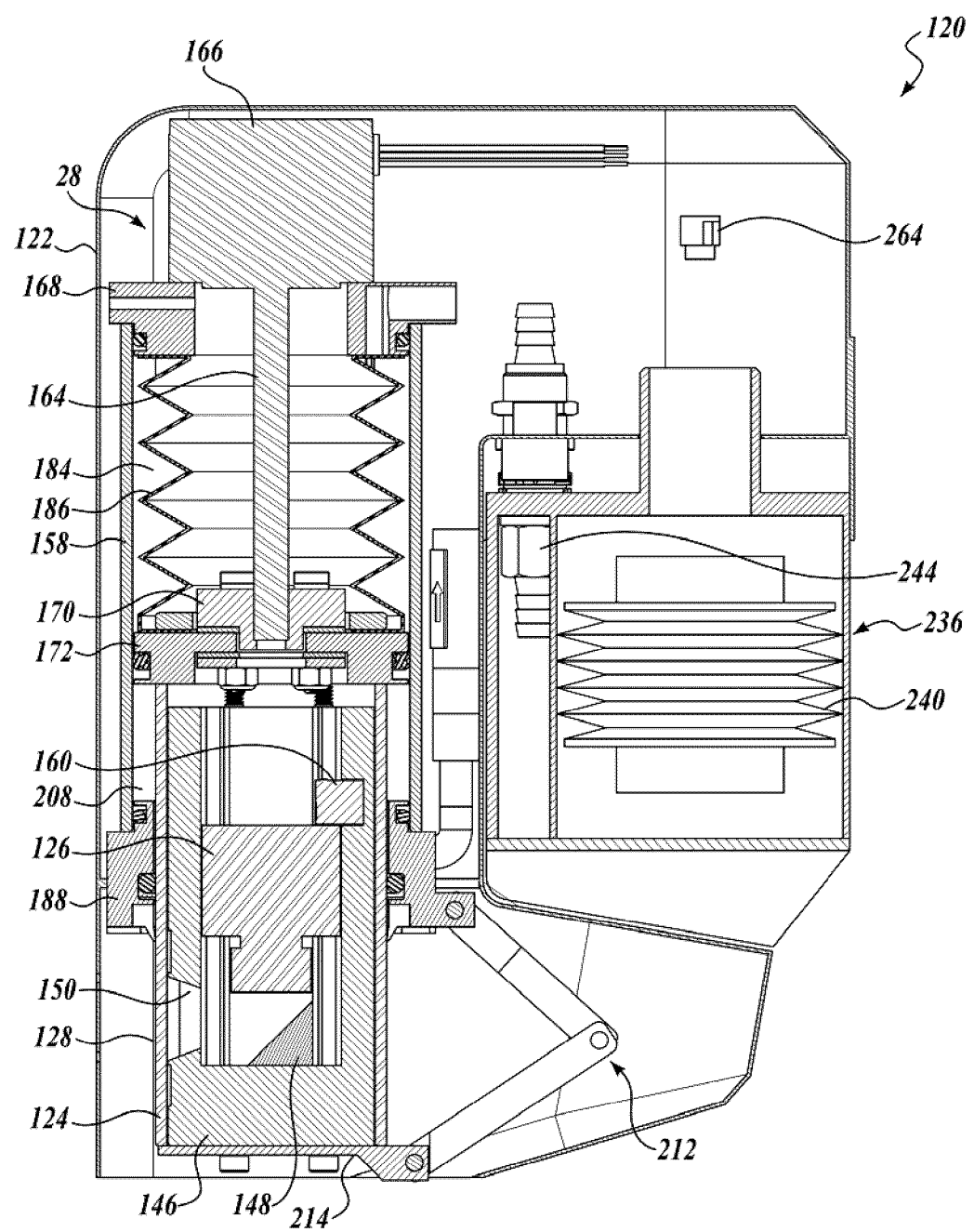
FIG. 3 is a cross section view of the optical assembly of FIG. 2, the optical assembly in the first or home position.

FIGS. 2 and 3 illustrate a perspective view and cross-sectional view, respectively, of one representative embodiment of a self-cleaning optical assembly 120. As shown in FIG. 2, the optical assembly 120 includes a housing 122 that protects the remaining components of the assembly. As shown in FIG. 3, some of the components disposed within the housing 122 include an optical body 124, which is in the form of a cylinder ("optical cylinder 124") in this embodiment. In one embodiment, the optical cylinder 124 is an optical grade substrate. In some embodiments, the optical cylinder 124 is constructed out of a number of different materials, such as scratch resistant optically clear polycarbonate, optical acrylic, and different types of glass. Other materials such as germanium could also be used to construct the optical cylinder in the case the optical device is a thermal camera.

Disposed within or otherwise protected by the optical cylinder 124 is at least one optical device 126. The optical device 126 can include but is not limited to devices referred to in the art as electro-optical sensors, photoelectric sensors, image sensors, light sensors, cameras, optical emitters, optical detectors, etc. In the embodiment shown in FIG. 3, which depicts the optical assembly in its home position or optically operating state, the optical device 126 includes a camera mounted inside a holding unit 146. As shown in FIG. 3, the camera is disposed longitudinally in the holding unit 146, which in turn, is installed longitudinally along the optical cylinder 124. The optical device 126 has a line of sight in the radial direction of the optical cylinder 124 via a 45 degree mirror 148 or other reflective medium, through a radial opening 150 in the holding unit 146 and a transparent wall portion of the optical cylinder 124, referred to as the optical window 128. The meaning of the word "transparent" as used herein expands beyond the visible light spectrum and conveys transparency to any particular wavelength used by the optical device, whether or not the material is transparent to human vision. In use, the optical window 128 is aligned with an opening 152 (FIG. 1) in the housing 122 when the optical cylinder 124 is in its home position of FIG. 3. In some embodiments, heating elements are mounted above and below the radial opening 150. The heating elements are configured and arranged to help eliminate condensation in front of the camera by heating the optical cylinder.

In the embodiment of FIG. 3, the optical device 126 is shown as having an optical axis parallel to a longitudinal axis of the housing 122, although other configuration are within the scope of the present disclosure. For example, in another embodiment, the optical device 126 can be mounted radially (as opposed to axially), thereby eliminating the need for the mirror 148. In the embodiment shown in FIGS. 2 and 3, the optical device and associated mirror are stationarily mounted within the optical cylinder. However, in some embodiments, the mirror can move in a tilting motion while the optical assembly can rotate about the center of the optical cylinder. Alternatively, the mirror can both tilt and rotate, while the rest of optical assembly remains stationary. In other embodiments, the optical assembly can be used as a scanning device. In this embodiment, the mirror and a detector associated with the mirror rotate about the center axis of the optical cylinder. In yet other embodiments, either the optical assembly and/or the optical device can be configured to rotate, if desired.

When assembled, the optical cylinder 124 is movable with respect to, and in one embodiment within, a portion of, a fluid cylinder 158 via the driving mechanism 30. As shown in FIG. 3, the driving mechanism 30 in one embodiment is a linear actuator composed of, for example, a lead screw 164 that is turned by an electric motor 166, such as a stepper motor. In one embodiment, a stepper motor with an integrated lead screw as the motor shaft is employed. In the embodiment shown, the motor 166 is supported by a cap 168, which seals one end of the fluid cylinder 158 with the aid of a suitable sealing means, such as an O-ring, heat bonding, chemical bonding, etc. The lead screw 164 extends inwardly into the fluid cylinder 158 in a coaxial manner. An optional sensor 160 may be provided to detect the end of the lead screw. In one embodiment, the output of the sensor 160 is used by at least one of the one or more controllers 40 as a positional reference when actuating the optical cylinder 124.

Engaged with the lead screw 164 is a lead screw nut 170. The lead screw nut 170 is rotationally fixed to a piston 172, which is securely mounted to the end of the optical cylinder 124. In operation, rotation of the lead screw 164 in both clockwise and counterclockwise directions via the electric motor 166 causes the lead screw nut 170, and in turn, the optical cylinder 124 to reciprocate within the fluid cylinder 158 between the positions shown, for example, in FIGS. 3 and 4. It will be appreciated that the electric motor 166 can be controlled via suitable drive signals in order to move the optical cylinder 124 through one complete cycle (i.e., first or home position of FIG. 3, retracted position of FIG. 4, first or home position of FIG. 3). While the driving mechanism 30 in the embodiment shown imparts movement to the optical cylinder, the driving mechanism 30 can be configured to impart movement to the fluid cylinder 158 instead.

Figure 6:
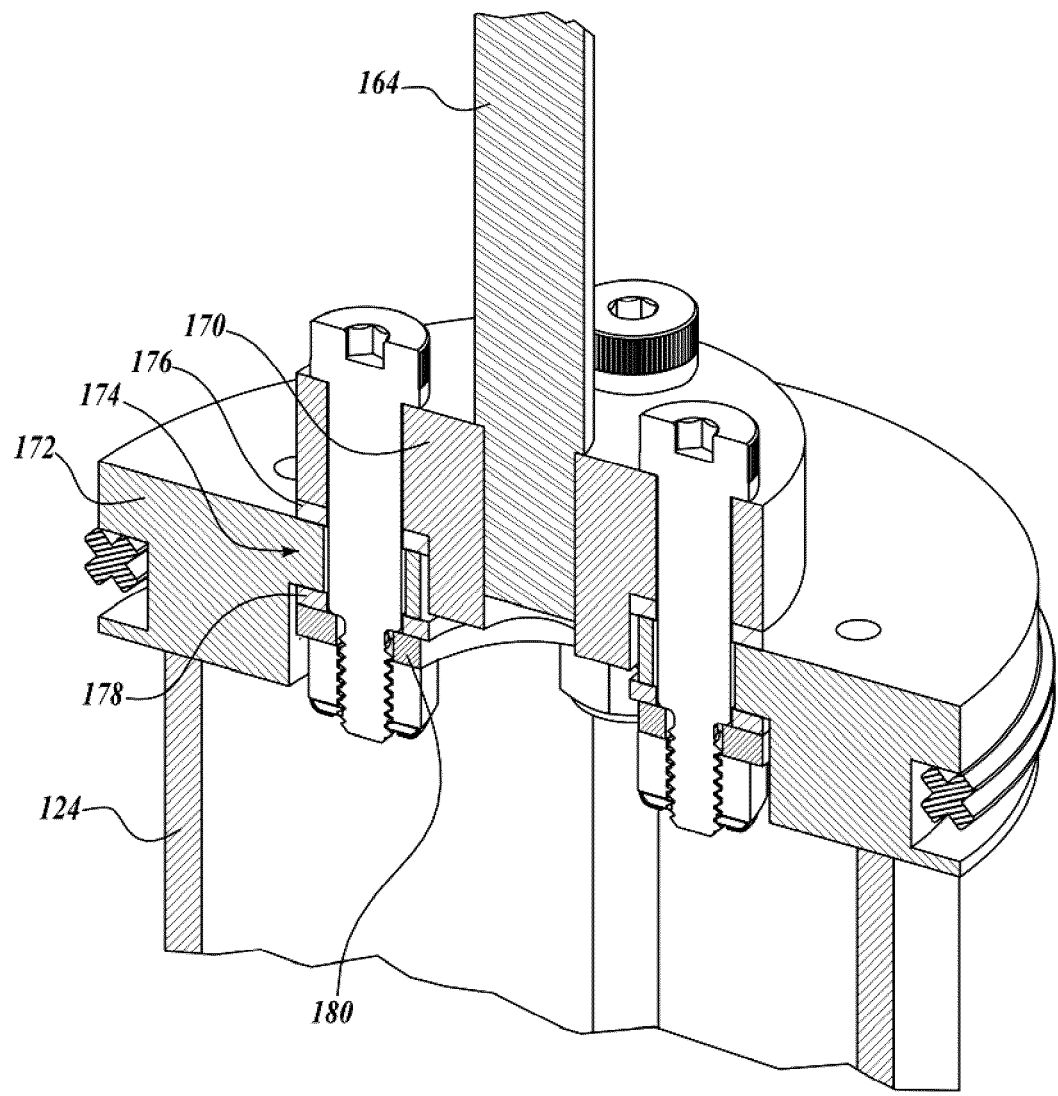
FIG. 6 is a partial perspective view of one embodiment of the interface between the drive mechanism and the optical cylinder.

In some embodiments, the lead screw nut 170 is connected to the piston 172 via a flexible coupling 174, as shown in FIG. 6. In one embodiment, the flexible coupling 174 is formed by an elastomeric washer 176 or the like positioned on both sides of the piston 172 and squeezed between the lead screw nut 170 and a plate 180. The amount of squeeze on the elastomer is controlled through the choice of the length of fasteners, for example, shoulder bolts, and the thickness of the elastomer. Accordingly, the flexible coupling 174 is configured to compensate for any angular misalignments or out-of-centeredness of the lead screw 164 with respect to the piston 172.

While the linear actuator is shown in one representative embodiment as a lead screw mechanism, other types of linear actuators may be practiced with embodiments of the present disclosure. For example, the linear actuator can be of the rack and pinion type, a pneumatic or hydraulic cylinder, a pulley/cable arrangement, a linear motor, etc. In embodiments where the optical cylinder is rotationally reciprocated, the drive mechanism includes an electric motor and gear arrangement, a linear actuator and a linear to rotational reciprocating mechanism, such as a scotch yoke, crank, etc., or any other currently known or future developed mechanism that can impart a rotationally reciprocating movement to the optical cylinder. Alternatively, the optical cylinder can be rotated directly or indirectly via the rotary output shaft of a suitable stepper or servo motor.

Returning to FIGS. 3 and 4, the piston 172 is configured to form a liquid tight seal against the inner wall of the fluid cylinder 158. In one embodiment, the seal is created with a X-Ring (i.e., an O-ring with a cross section resembling an "X"). The X-ring is employed in some embodiments in order to reduce friction between the piston and the fluid cylinder as compared to some other seal types, although any other piston seal can be utilized. As such, a first sealed fluid chamber 184 is formed within the walls of the fluid cylinder between the sealed end of the fluid cylinder 160 and the piston 172.

In the embodiment shown, the lead screw 164 and the lead screw nut 170 are disposed within an optional impermeable bellows 186. The bellows 186 at one end is sealed against the piston 172 and at the other end is sealed against the cap 168. In these embodiments, the first fluid chamber 184 is formed between the walls of the fluid cylinder 158 and the bellows 186.

Figure 4:
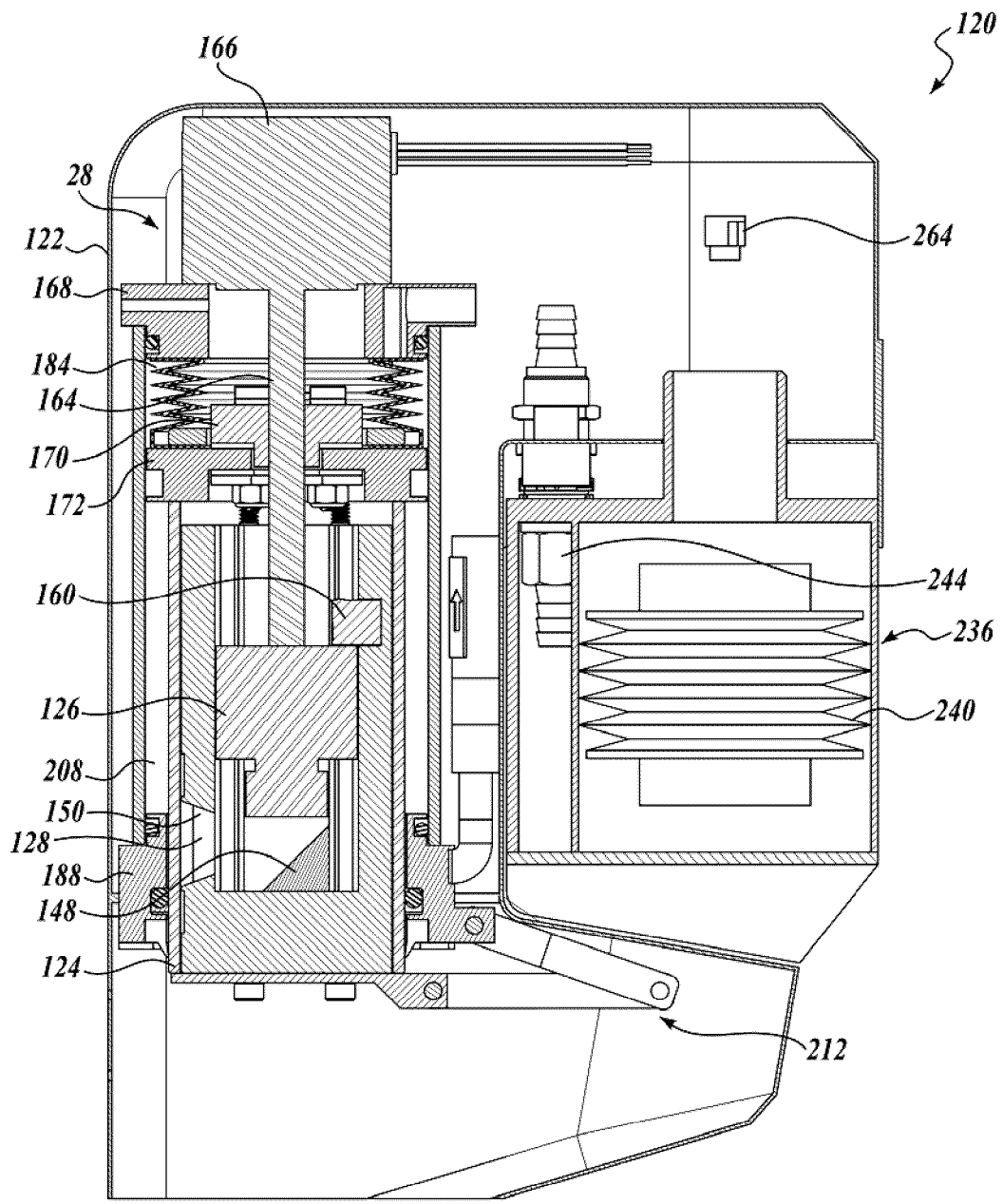
FIG. 4 is a cross section view of the optical assembly of FIG. 2, the optical assembly in the second or retracted position.

A gland 188 is sealably mounted to the end of the fluid cylinder 158 opposite the cap 168. The gland 188 surrounds the optical cylinder 124 and allows the optical cylinder 124 to reciprocate therethrough. In the embodiment shown in FIG. 7, the gland 188 defines an inner bore 200 through which the optical cylinder 124 reciprocally moves. In some embodiments, the inner bore 200 is configured such that an inner bore surface supports the outer surface of the optical cylinder 124 in a guiding manner as it moves therethrough. In other embodiments, the inner bore 200 is sized and configured such that the inner bore surface bears against the outer surface of the optical cylinder 30 so as to form a linear bearing. When assembled, the optical cylinder 124, the fluid cylinder 158, the piston 172 and the gland 188 cooperate to define a second fluid chamber 208, as shown in FIGS. 3 and 4. In particular, the second fluid chamber 208 is formed between the gland end of the fluid cylinder 158 and the piston 172, and between the outer surface of the optical cylinder 124 and the inner surface of the fluid cylinder 158. As will be described in more detail below, the second fluid chamber forms a part of a fluid applicator or dispensing mechanism 36.

Figure 7:
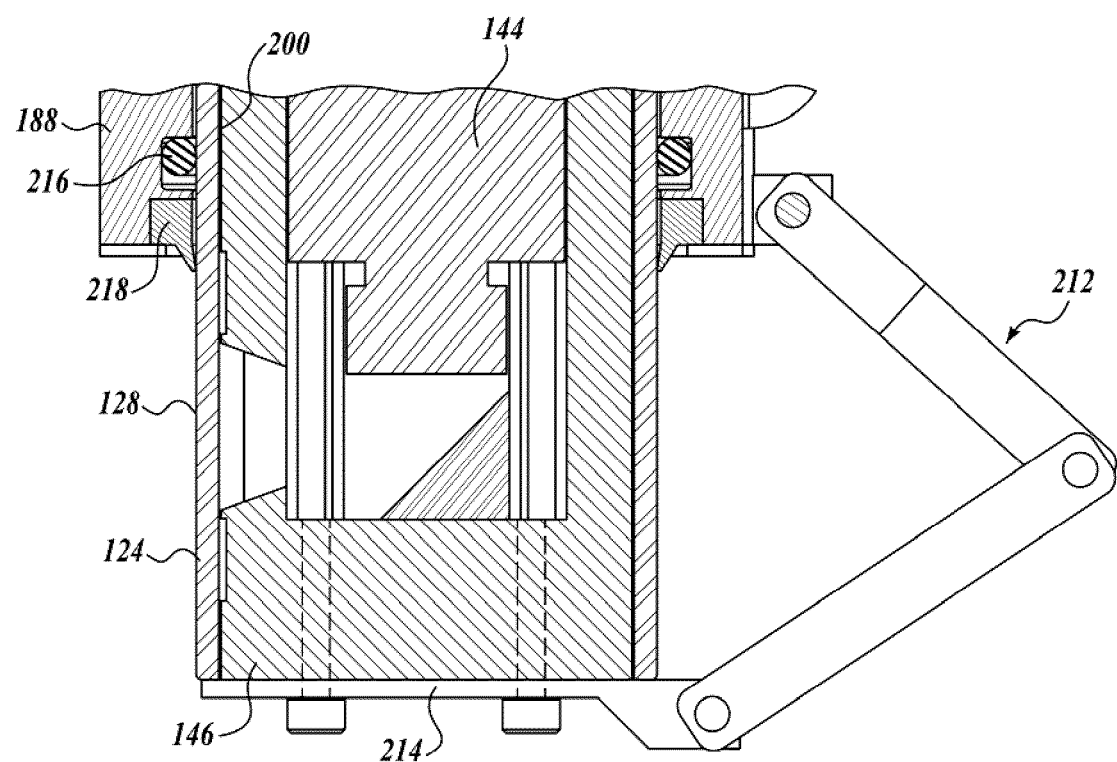
FIG. 7 is an enlarged partial cross-sectional view of the optical cylinder.

In the embodiment shown in FIG. 7, a stabilizing linkage 212 is provided, one end of the stabilizing linkage 212 is anchored to the gland 188 while the opposite end is connected to an optical cylinder end cap 214. Accordingly, in these embodiments, the stabilizing linkage 212 prevents rotation of the optical cylinder 124, which in turn, prevents rotation of the lead screw nut 170. It will be appreciated that other mechanisms or configurations of the optical cylinder/gland can be employed to provide rotation prevention of the optical cylinder 124.

Referring now to FIGS. 3, 4, and 7, the gland 188 includes a primary seal 216 configured and arranged to seal the second fluid chamber 208. In the embodiment shown, the sealing action occurs between the exterior surface of the optical cylinder 124 and the inner bore surface of the gland 188. In some embodiments, the primary seal is compressed between the exterior surface of the optical cylinder 124 and the inner bore surface of the gland 188. As such, the primary seal 216 exerts pressure against the outer surface of the optical cylinder 124. In one embodiment, the piston seal can be omitted such that the first and second fluid chambers 184 and 208 together form a single fluid reservoir.

In use, the second fluid chamber 208 stores a quantity of non-stick liquid. In some embodiments, the second fluid chamber 208 stores enough liquid for a plurality (e.g., 2 or more, 5 or more, 10 or more, 20 or more, 50 or more, etc.) of cleaning cycles. While the primary seal 216 seals the second fluid chamber 208, the primary seal also helps to apply or maintain a thin (e.g., a few microns) layer of liquid on the optical cylinder 124. Thus, when the optical cylinder 124 is reciprocally moved with respect to the fluid cylinder 158, at least the optical window 128 of the optical cylinder 124 comes into fluid contact with the liquid disposed therein. When the optical window 128 is reciprocally moved in the opposite direction so as to remove the optical window from fluid contact within the second fluid chamber 208, the primary seal 200 aids in the formation of a thin layer of non-stick liquid that remains on the optical window 128 as the optical cylinder 124 returns to its home position. As such, at least the second fluid chamber 208 and the primary seal 216 together form one embodiment of the fluid dispensing mechanism 36. It will be appreciated that the size and/or compression of the primary seal 216 can be used in controlling the thickness of the liquid layer.

The gland 188 further includes a secondary seal 218 disposed between the exterior surface of the optical cylinder 124 and the inner bore surface of the gland 188. The secondary seal 208 is positioned closer to the free end of the optical cylinder 124 than the primary seal 200 (e.g., positioned exteriorly of the primary seal 216). The secondary seal 218 is configured with a sharp edge and tapers at an acute angle inwardly toward the outer surface of the optical cylinder 124 in some embodiments. The secondary seal 218 is further configured and arranged such that its outermost edge is flush against and exerts a positive pressure against the outer surface of optical cylinder 124. As such, the secondary seal 218 is configured to scrape or wipe away contaminants rather than to seal fluids, and therefore, can also be referred to herein as a wiping element or wiper ("wiper 218") or at least a part of one embodiment of the optical body cleaning mechanism 32. In some embodiments, the wiper 218 is fabricated out of an elastomer having a hardness value similar to the primary seal 216. In other embodiments, the wiper 218 is fabricated out of an elastomer having a hardness value greater than the primary seal 216. In one embodiment, the wiper 218 has a Shore A hardness in the range of about 85-95. It should also be appreciated that the material chosen for the wiper 218 should be chemically compatible with the non-stick liquid and vice versa.

In one embodiment, if the installation orientation of the device prevents fluid starvation of the primary seal, a non-sealing piston may be used. A non-sealing piston can still utilize a flexible seal but also includes channels to allow flow of fluid between the first and second fluid chambers. Such a piston would still provide damping, self-centering characteristics and support but would reduce the amount of actuation force needed to move the optical cylinder.

In one embodiment, the primary seal 216 and secondary seal 218 are integrally formed. In this example, the seal body includes two lips that serve the functions of the primary seal and wiper described above.

As described above, the second fluid chamber 208 defines a fluid reservoir for dispensing a non-stick liquid onto the outer surface of the optical window of the optical cylinder 124. In one embodiment, the second fluid chamber 208 is a discrete, stand-alone fluid reservoir. In other embodiments, the fluid reservoir can be replenished via either a local fluid source, such as a fluid cartridge 236, or a remote fluid source, via appropriately arranged fluid lines, passages, connectors, etc.

Figure 10:
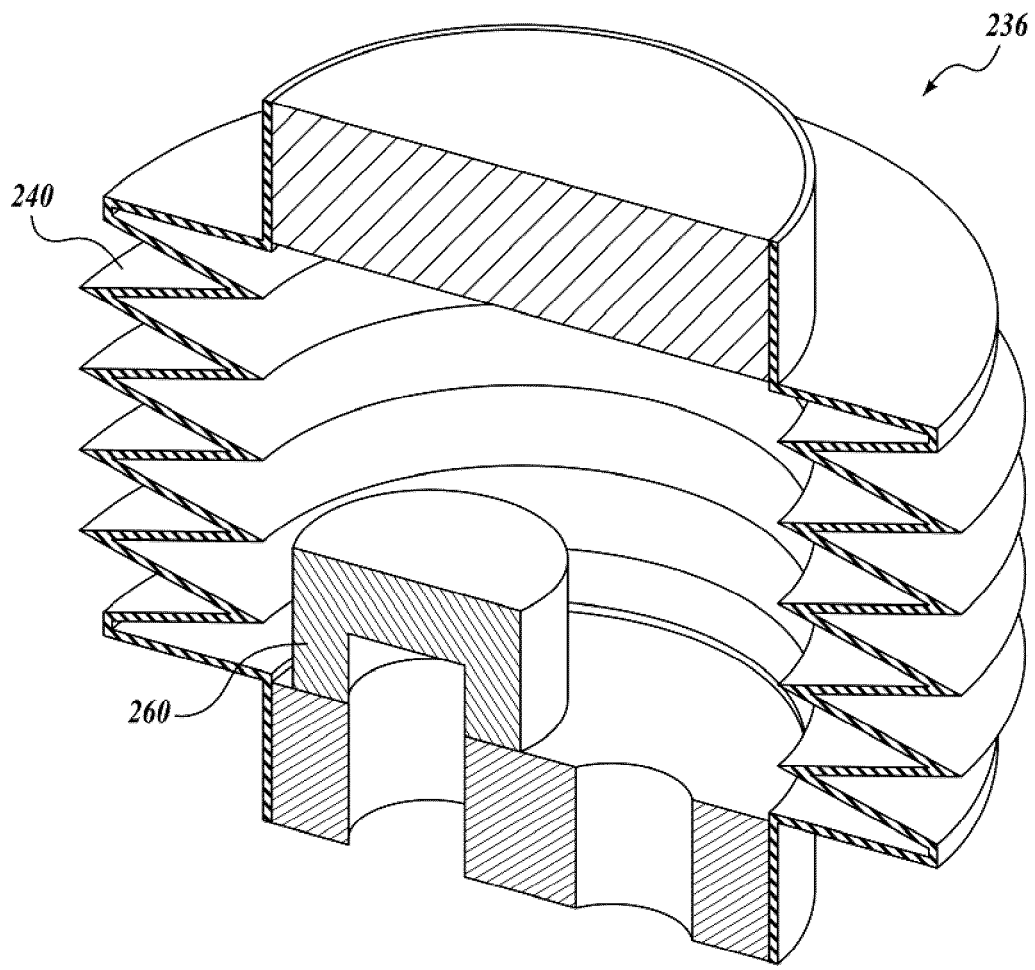
FIG. 10 is a cross-sectional view of one component of the fluid cartridge in accordance with an aspect of the present disclosure.
Figure 11:
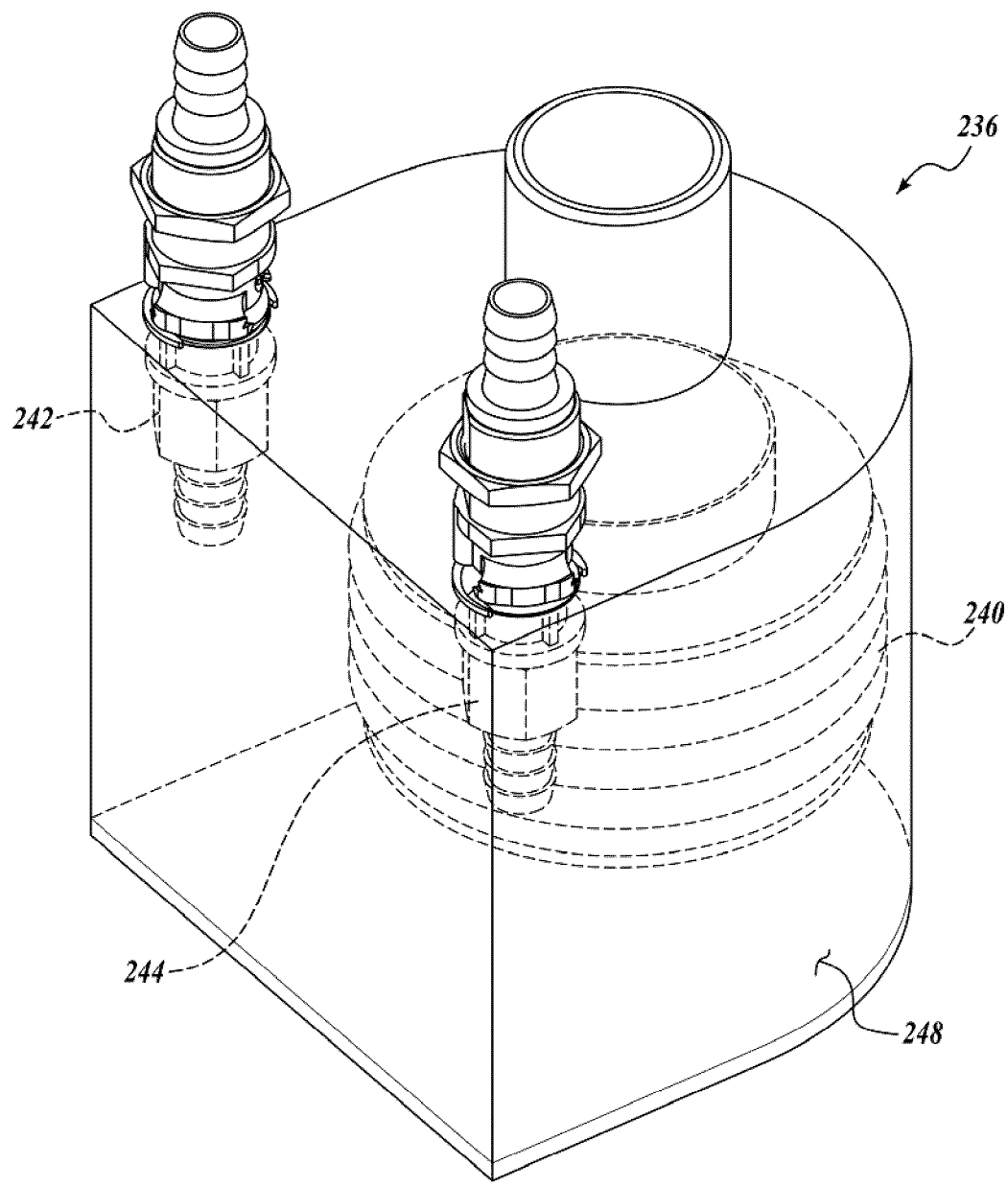
FIG. 11 is a perspective view of one representative embodiment of a fluid cartridge in accordance with an aspect of the present disclosure.

FIG. 10 illustrates one embodiment of an optional fluid cartridge 236 that can be practiced with embodiments of the present disclosure for supplying non-stick liquid to the fluid reservoir (e.g., the second fluid chamber 208 or the combined space of first and second fluid chambers 184 and 208). As shown in the embodiment of FIGS. 10 and 11, the fluid cartridge 236 includes an enclosure 238 that houses a fluid reservoir formed by a sealed expandable bellows 240. In another embodiment, the fluid cartridge 236 includes a rigid liquid storage tank and a breather vent that functions to avoid pressure drop as the liquid is used up as well as to neutralize any pressure change due to volume differences between first and second chambers 184 and 208 during an extension and retraction cycle.

In either case, first and second press-to-connect fluid fittings 242 and 244 are mounted to the fluid cartridge 236 and are configured to cooperate with corresponding fittings within the housing 122. The fluid cartridge 236 in some embodiments also includes an optional filter 260 for filtering any non-stick liquid returned to the fluid cartridge, as will be described in more detail below. In one embodiment, the fluid cartridge 236 and the housing 122 are cooperatively configured so that the fluid cartridge 236 is removably mounted in the housing 122, as shown in FIGS. 1-3. Accordingly, once the liquid in the fluid cartridge is depleted, the fluid cartridge 236 can be replaced.

In one embodiment, the level of liquid inside the fluid cartridge 236 is monitored so as to provide a fluid cartridge replacement notification function to the optical assembly 20. For example, the level of liquid in the fluid cartridge can be indirectly measured by an optical proximity sensor 264, as shown in FIG. 3. In use, the proximity sensor 264 is configured to measure the height of the bellows 240 and transmit such measurement to the one or more controllers 40. When the one or more controllers 40 determines that the height of the bellows 240 is below the replacement threshold, the controller 240 outputs an alert to the user, via an electric signal transmitted to a central monitoring station, activating a visual indicator, such as an LED or the like, among others.

Figure 8:
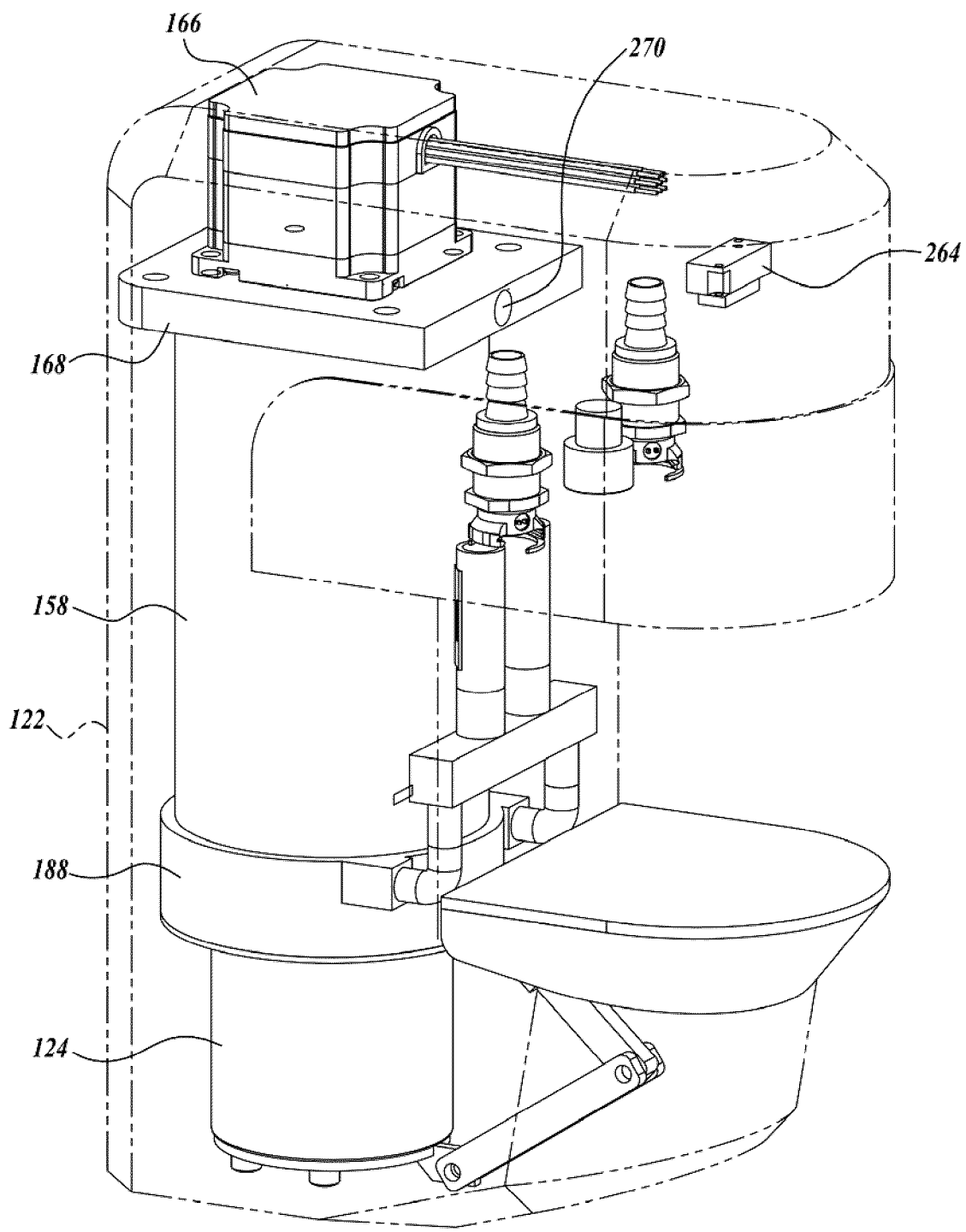
FIG. 8 is a perspective view of the optical assembly of FIG. 1 without a fluid cartridge.
Figure 9:
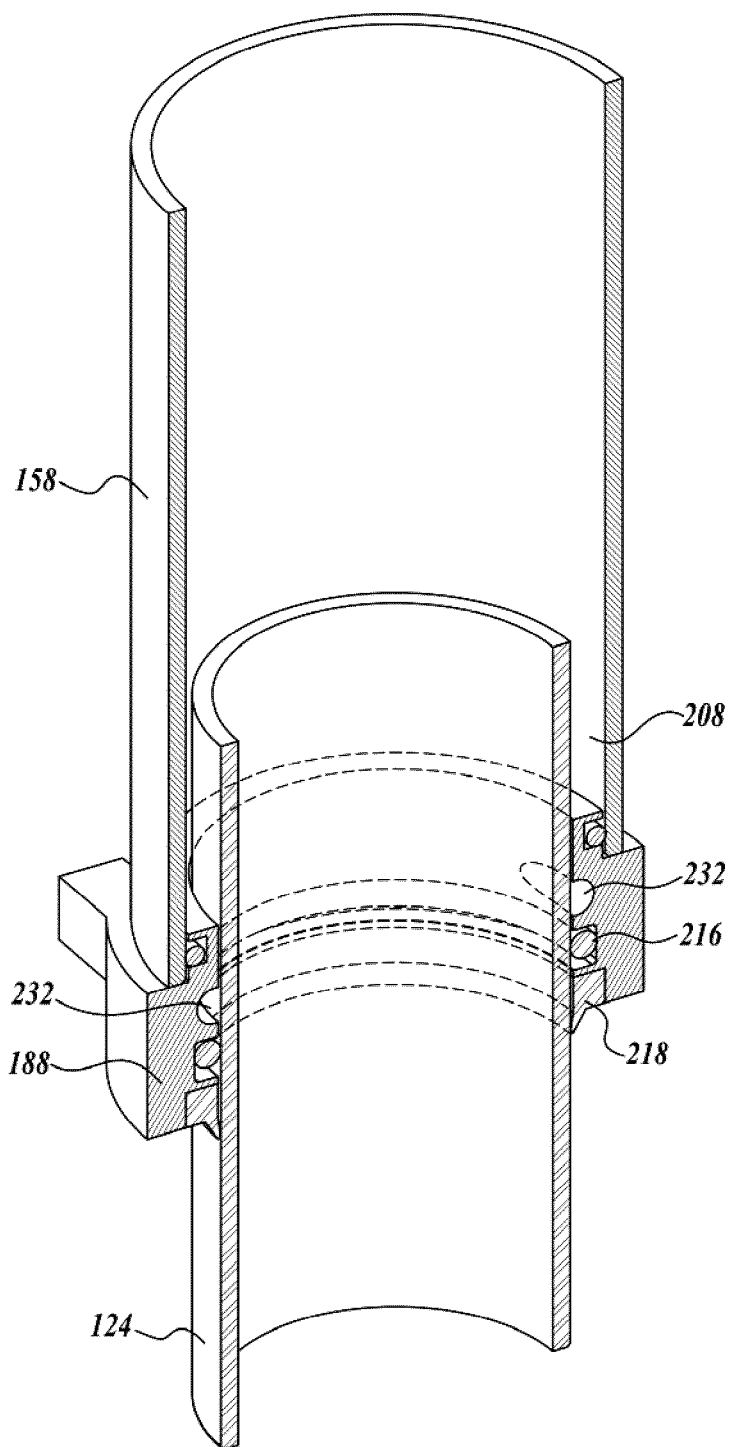
FIG. 9 is a cross-sectional view of components of the optical assembly of FIG. 1.

In order to gain access to the second fluid chamber 208, at least one port 232 is provided. In the embodiment shown in FIG. 9, the at least one port 232 includes two ports disposed in the gland 188. In this embodiment, the gland 188 includes suitable connection interfaces that are in fluid communication with the ports 232, as shown in FIG. 8. The connection interfaces provide a simple interface for connection with fluid conduits, piping, hose or the like, that form one or more fluid lines. The fluid lines can be connected to the on-board or local fluid source, such as the fluid cartridge 236, and/or with a remotely located fluid source in a conventional manner.

Figure 5:
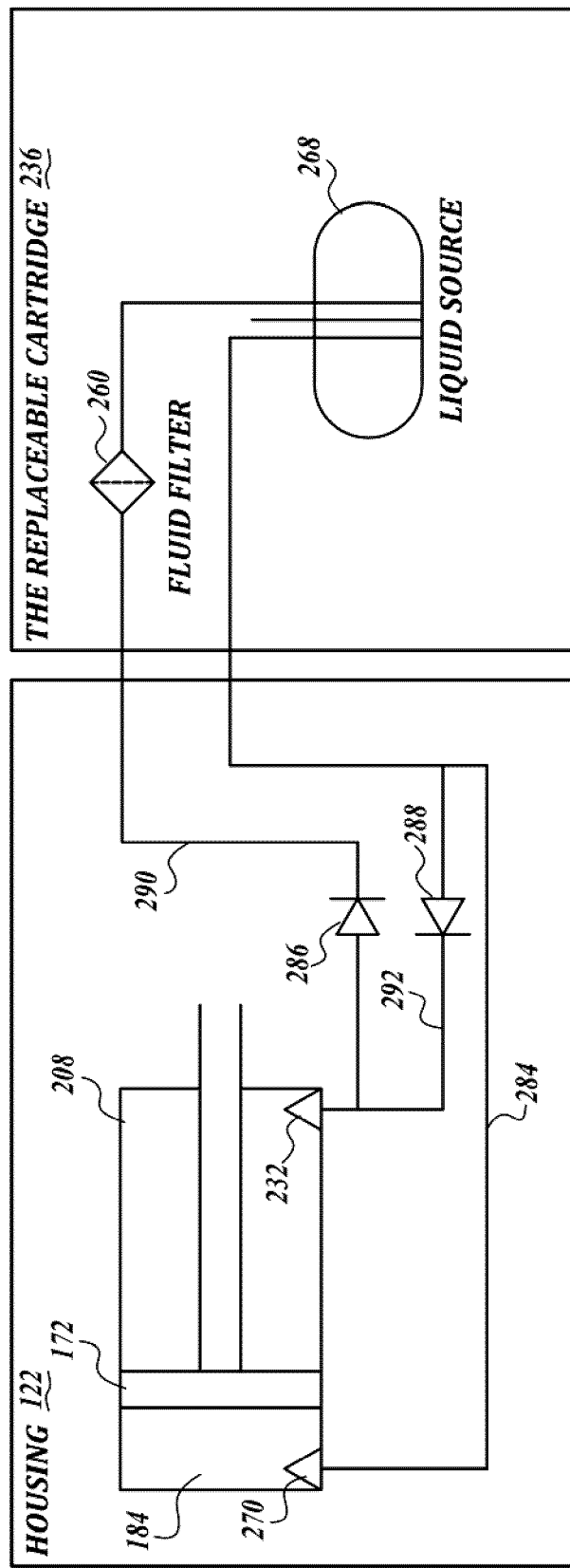
FIG. 5 is a schematic diagram of a liquid circuit formed in accordance with an aspect of the present disclosure.

FIG. 5 is a schematic diagram of a fluid circuit formed in accordance with an aspect of the present disclosure. The fluid circuit can be employed by embodiments of the optical assembly 20. As discussed briefly above, the second fluid chamber 208 in one embodiment is connected in fluid communication with a source 268 of non-stick liquid, via the ports 232. Similarly, the first fluid chamber 184 in one embodiment is connected in fluid communication with the liquid source 268. In that regard, access to the first fluid chamber 184 is provided by a port 270 (see also FIGS. 3 and 8). In the embodiment shown, the port 270 is disposed in the cap 168. In this embodiment, a suitable fluid fitting can be used to provide a simple interface for connection with fluid conduits, piping, hose or the like, that form one or more fluid lines.

As shown in FIG. 5, the first fluid chamber 184 is connected to the source 268 of non-stick liquid via fluid line 284. The second fluid chamber 208 is connected in fluid communication to the liquid source 268 through check valves 286 and 288 and fluid lines 290 and 292, respectively. In one embodiment, the fluid line 292 is connected in fluid communication with fluid line 284, and in turn, the liquid source 268. In the embodiment shown, the check valve 286 is associated with fluid line 290 and is configured to allow fluid flow from the second fluid chamber 208 to the liquid source 268 but prevents reverse fluid flow from the liquid source 268 to the second fluid chamber 208. Check valve 288 is configured to allow fluid flow via lines 284, 292 to the second fluid chamber 208 from the liquid source 268 but prevents fluid flow from the second fluid chamber 208 to the liquid source 268. In one embodiment, an optional filter 260 is placed in-line with fluid line 290 between the check valve 286 and the liquid source 268. The optional filter 246 can be used if needed, such as in situations where the contamination particle size approaches the surface roughness of the optical cylinder. In one embodiment where the liquid source 268 includes the fluid cartridge, the filter 246 is incorporated therein.

One representative method for operating the optical assembly 20 during a cleaning cycle will now be described with regards to FIGS. 2-10. As was briefly described above, the optical assembly operates in its environment with the optical cylinder 124 in the extended state, as shown in FIG. 3. After a preselected time determined by, for example, at least one of the one or more controllers 40, or by a signal indicative of a dirty optical window, the optical cylinder 124 is actuated through a cleaning cycle under the control of the one or more controllers 40. As was briefly described above and described in more detail below, the cleaning cycle includes two stages, for example.

While the one or more controllers 40 are shown as being located "on-board" the optical assembly 20, it will be appreciated that at least one of the one or more controllers 40 can be located "off-board" in a remote location. In one embodiment, an "on-board" controller is configured to receive control and other signals from an "off-board" controller. The one or more controllers 40 are connected in electrical communication with the driving mechanism 30 and one or more sensors, such as sensor 160, optical proximity sensor 264 and/or dirt/debris sensor 300. The one or more controllers 40 include logic for controlling the movement of the optical cylinder 124. It will be appreciated by one skilled in the art that the logic may be implemented in a variety of configurations, including but not limited to, hardware, software, and combinations thereof. In some embodiments, the controller 36 includes a processor and memory. The memory can be any volatile and nonvolatile storage media in the form of read-only memory (ROM), random-access memory (RAM), and keep-alive memory (KAM), for example. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data. The data includes executable instructions, used by processor, in controlling the operation of at least the driving mechanism 30.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. In one embodiment, the processor executes instructions stored in memory to provide suitable control signals to the driving mechanism, etc.

In one embodiment, the preselected time is chosen and programmed into the one or more controllers 40 based on the "dry out" period of the liquid employed as the liquid. In this regard, the "dry out" period depends in part on the vapor pressure of the fluid, ambient temperature, as well as the severity of the convection that the exposed part of the optical cylinder is subject to. Accordingly, the preselected time is chosen in one embodiment to be less than the time it takes for the liquid film on the optical cylinder to dry out or evaporate.

The first stage of the cleaning cycle includes movement of the optical cylinder 124 in a first direction with respect to the fluid cylinder 158. In that regard, the linear actuator, such as the lead screw 164, is controlled by suitable signals from the one or more controllers 40 in order to retract the optical cylinder 124 from its first or home position shown in FIG. 3 to a retracted position shown in FIG. 4. As the optical cylinder 124 retracts into the fluid cylinder 158, any contaminants present on the optical cylinder 124 are pushed or wiped downwardly relative to the optical cylinder 124 by the wiper 218 and removed therefrom. In one embodiment, the contaminants fall away (due to gravity) from the optical cylinder 124 through an open bottom of the housing 22 when sufficient accumulation of the contaminants occurs. As such, the wiper 218 cleans the outside surface of the optical cylinder 124, including the optical window 128. In some embodiments where the optical cylinder is deployed at an acute angle with the ground, the optical cylinder can further include a cap that seals its free end. In this and other embodiments, the cap is cone shaped so as to facilitate guiding of the liquid towards the ground.

As the wiper 218 cleans the outside surface of the moving optical cylinder 124, the piston 172, which moves with the optical cylinder 124, forces any non-stick liquid present in the first fluid chamber 184 out through port 270 and back into the liquid source 268 via the fluid line 284. Contemporaneously, non-stick liquid is drawn into the second fluid chamber 208 only through fluid line 292 due to the operation of the check valves 286 and 288. In particular, check valve 286 prevents liquid flow through the filter 260 and fluid line 290 while check valve 288 allows fluid to flow in the direction from the fluid reservoir to the second fluid chamber 208. This results in fluid flow through the filter 260 in only one direction. As such, the recirculation of any particles contained by the filter is prevented. As the fluid fills the second fluid chamber 208, the exterior of the optical cylinder 124 is immersed in the non-stick liquid.

The second stage includes movement of the optical cylinder 124 in a second direction opposite the first direction to return the optical cylinder 124 to its first or home position. In that regard, the linear actuator, such as the lead screw 164, is controlled by suitable signals transmitted from the one or more controllers 40 in order to extend the optical cylinder 124 from the second or retracted position shown in FIG. 4 to the first or home position shown in FIG. 3. During this stage, as the optical cylinder 124 extends from the fluid cylinder 158, a fresh layer of non-stick liquid adheres to and coats the exterior of the optical cylinder, including the optical window 128. The thickness of the fluid layer depends on a variety of factors such as the surface roughness of the optical cylinder, roughness of the primary seal, the hardness of the primary seal, the amount of squeeze applied on the primary seal and the relative speed of movement of the optical cylinder, among other factors.

Extension of the optical cylinder 124 also causes the first fluid chamber 184 to fill with fluid from the liquid source, such as the fluid cartridge 236, through line 284 and port 270. Liquid fills the first fluid chamber 184 as the pressure drops in the first fluid chamber 184 due to the suction action of the piston 172. Simultaneously, the fluid in the second fluid chamber 208 is pushed out through the ports 232, through lines 290 and 292 to check valves 286 and 288. Only check valve 286 allows the fluid to pass, which then continues to flow through the option filter 260 and into the liquid source, such as the fluid cartridge 236. On the other hand, check valve 288 blocks further flow of fluid through fluid line 292.

As briefly described above, the cleaning cycle can be initiated either by a preselected elapse of time, a signal indicative of a dirty optical window, etc. There are various ways of sensing the desirability for a cleaning cycle. For example, if the optical device is a camera, the camera image itself could be used to detect smudge/dirt or to detect rain drops affecting the image. In other embodiments, the signal is generated by a dirt/debris detection sensor.

Figure 12:
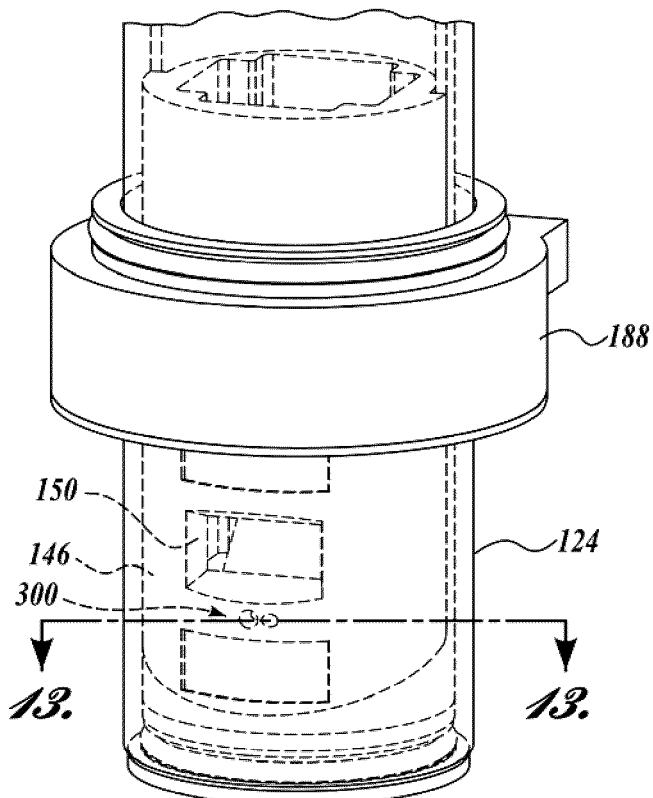
FIG. 12 is a partial perspective view of components of the optical assembly of FIG. 1.
Figure 13:
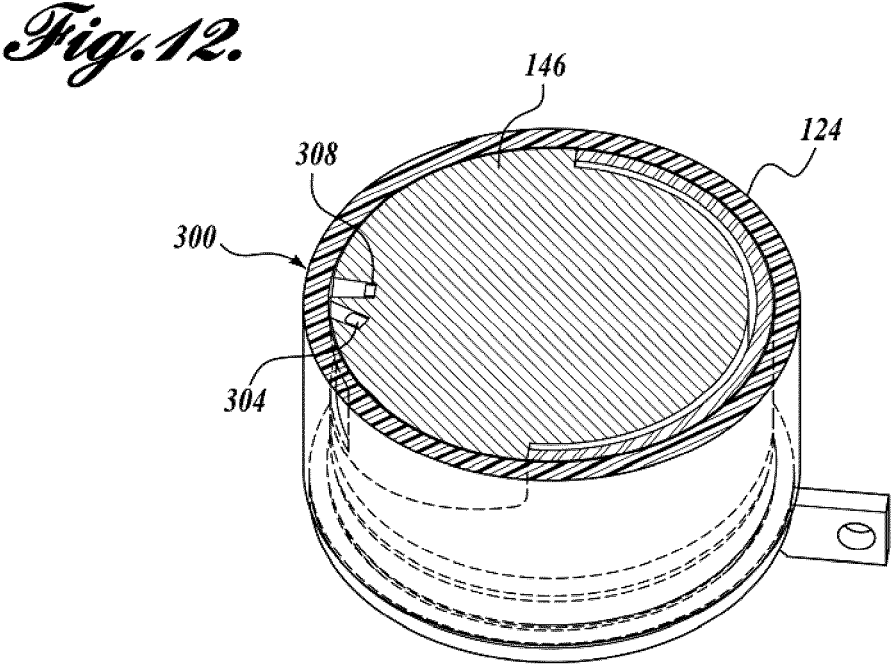
FIG. 13 is a cross sectional view of the components of the optical assembly taken along the line 13-13 of FIG. 12.

FIGS. 12-13 illustrate one embodiment of a dirt/debris detection sensor 300 that can be practiced with embodiments of the present disclosure. As shown in FIG. 12, the sensor 300 measures and/or detects the state of clarity of the optical cylinder. In the embodiment shown in FIG. 12, the sensor 300 includes an emitter 304 and a detector 308. In one embodiment, the sensor 300 includes a single frequency emitter such as a laser and a narrow bandwidth detector suitable for detecting the wavelength produced by the emitter. In one embodiment, the emitter 304 and the detector 308 can be mounted in the holding unit 146, as shown in FIG. 13. It will be appreciated that the closer the emitter and the detector are to the opening 150, the more relevant the sensing will be to the cleanliness of the view of the optical device.

FIG. 13 shows a cross section of the optical cylinder where the emitter 304 and the detector 308 are installed. As shown in schematic representations in FIGS. 14A and 14B, the angle of the emitter 304 is less than the critical refraction angle of the optical cylinder 124 such that the ray of light 310 after refracting in the optical cylinder exits to the environment without refracting back in. Additionally, the emitter 304 is positioned such that the exit point 314 of the ray of light 310 on the exterior of the optical cylinder 124 is positioned right in front of the detector 308. In an effort to maximize capture of the reflected light, the detector 308 in another embodiment can be placed such that it creates the same angle with respect to the radius of the circle as the emitter 304, as shown in FIGS. 15A-15B. When the optical cylinder 124 is clean, the ray of light 310 exits to the environment without affecting the detector 308, as shown in FIG. 14. However, in the presence of an obstruction 318, such as a contaminant, the ray of light 310 reflects back in various directions at the point of the incident, as shown in FIG. 15.

In some embodiments, in order to distinguish whether the detected light at the detector 308 is coming from the sun or from the emitter 304, the emitter 304 is periodically pulsed several times a second by the one or more of the controllers 40. In one embodiment, the one or more controllers 40 compare the output of the detector 308 when the emitter 304 is on against the times that the emitter 304 is off. If the difference is consistently larger than a certain threshold, such difference indicates that the optical cylinder is blocked by an object. This analysis in one embodiment is done on-board by at least one of the one or more controllers 40. The results can also be communicated to a remote system.

In some embodiments, it has been observed that when the detector is directly facing the sunlight, the sensor can become saturated. To address any possible saturation, any combination of the following solutions can be implemented.

Firstly, filtering and attenuating the incoming light to the sensor (within the bandwidth of the sensor) can be implemented to generate a sufficient margin before saturating the detector. Doing so would also attenuate the light emitted by the emitter. Consequently, the power of the emitter can be adjusted accordingly to generate an adequate change in the detection value upon its operation.

Secondly, the wavelength of the emitter and the detector can be chosen to fall within the atmospheric absorption bands where the intensity of the wavelength of choice has been significantly attenuated due to atmospheric elements. In this case, saturation of the detector is less of a concern.

Figure 16:
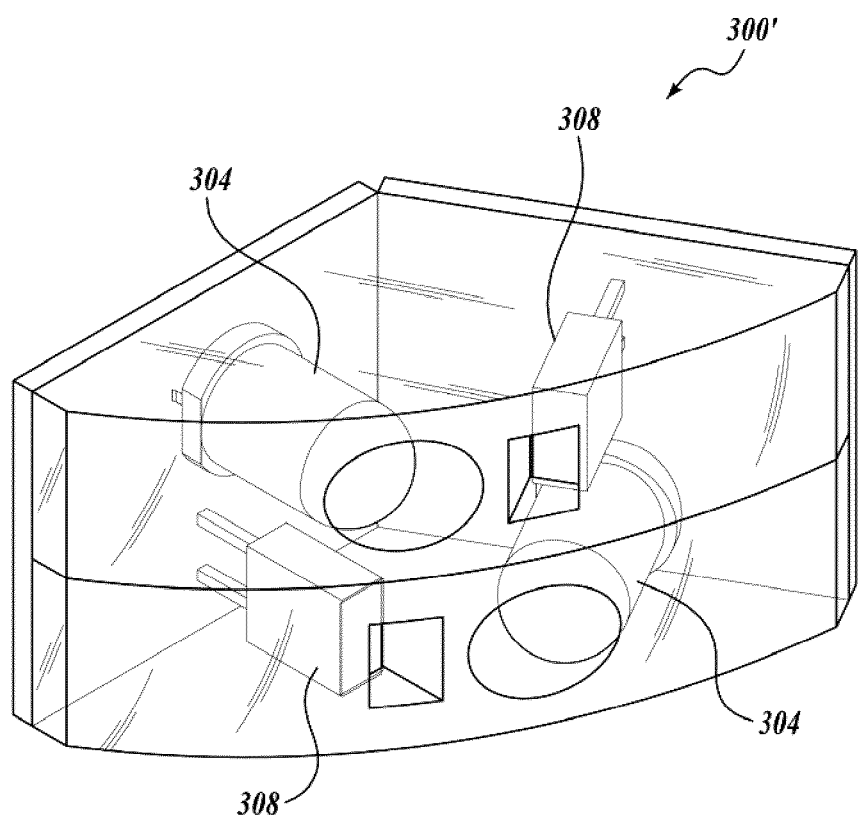
FIG. 16 is a perspective view of one representative embodiment of a dirt/debris sensor in accordance with an aspect of the present disclosure.

Thirdly, another embodiment of a sensor 300' can be employed, having a pair of emitters and a pair of detectors, as shown in FIG. 16. As shown in FIG. 16, the detectors 308 can be arranged such that their orientation is such that when one detector is facing the sun, the other detector would be looking away from the sun. Such a design prevents simultaneous saturation of all detectors. In this case, the output of all sensors are read and analyzed by the one or more controllers 40. In this embodiment, the output of the detector which is determined to be saturated will be omitted.

In the embodiment shown, the detectors 308 are each shown as a rectangular transducer, both of which are pointing at very different angles than each other ensuring that they do not saturate simultaneously due to the same light source. The curved surface of the sensor faces exteriorly and matches in some embodiments with the curvature of the inside of the optical body. Placement of the sensor 300' in complete contact with the optical body minimizes the amount of light leaking from the emitters 304 to the detectors 308. In some embodiments, the emitters 304 transmit at about a 940 nm wavelength.

The techniques and methodologies described above can be employed in various devices, systems, and assemblies. Additionally, the techniques and methodologies described above can be employed in other configurations of the optical assembly. For example, in some applications, having a pair of optical devices is beneficial or advantageous. An example of such application is a stereo camera which enables calculation of depth information in addition to the camera view. This example can be implemented in many different configurations. For example, an optical assembly according to another embodiment integrates two optical devices into one longer optical cylinder. In this embodiment, one of the optical devices is positioned at each end of the cylinder and a piston is attached to the middle of the optical cylinder. Other configurations are possible, as will be described in more detail below.

One embodiment of an optical assembly is formed generally by placing the working components of two optical assemblies 20 back-to-back. In this embodiment, two separate optical cylinders, each attached to a liquid tight piston are employed. In this embodiment, each optical cylinder shares the same fluid cylinder. In operation, the wiping action to clean the optical cylinders would involve extension and retraction of each individual optical cylinder. In the fully retracted mode the two pistons are closest to each other while in the extension configuration the two pistons are the farthest from each other.

This configuration could be useful when merely two optical devices are desired to be packaged into one device. However, in some applications, it is preferred that the optical devices, such as stereo cameras, are fixed with respect to each other in order to keep their calibration. Even slight positional variations between the cameras from one cycle to the other could be detrimental to the performance of the stereo camera pair.

Figure 17:
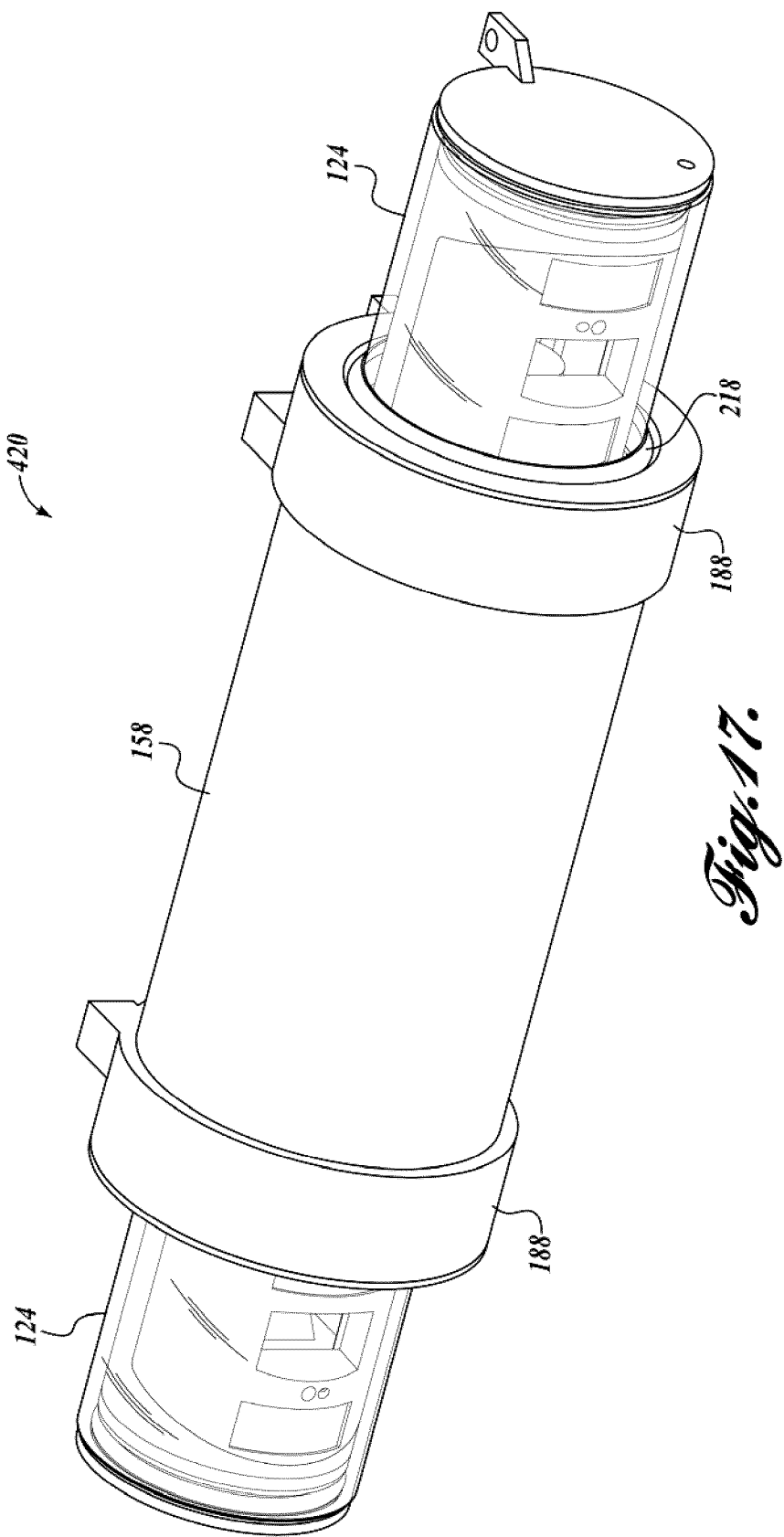
FIG. 17 is a perspective view of another embodiment of an optical assembly in accordance with an aspect of the present disclosure.
Figure 18:
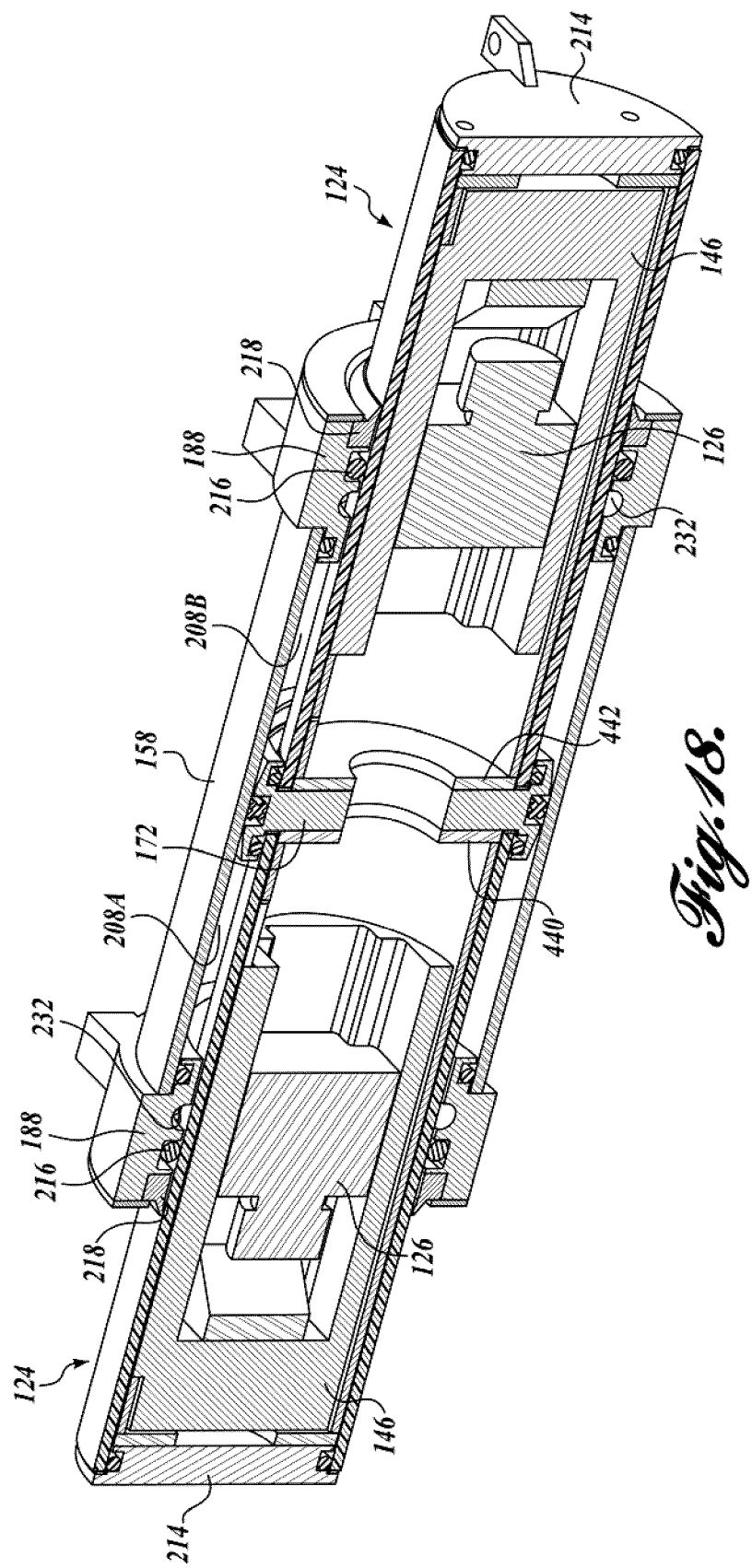
FIG. 18 is cross sectional view of another embodiment of an optical assembly in accordance with an aspect of the present disclosure.

FIG. 17 illustrates another embodiment of an optical assembly 420 formed in accordance with an aspect of the present disclosure where the optical devices are fixed with respect to one another. The optical assembly 420 is substantially similar in construction and operation as the optical assembly 20 described above except for the differences that will be explain in more detail below. As shown in FIGS. 17 and 18, the optical assembly 420 includes two optical cylinders that are joined by a piston 172 at the middle and are enclosed in the same fluid cylinder 158. As such, relative movement of the two joined optical cylinders with respect to the fluid cylinder creates the wiping action.

In the embodiment shown in FIGS. 17 and 18, two support arms 440 and 442 are attached to the piston 172 at the center, while the other ends of the support arms are attached to the end caps 214. The connections between the support arms, the piston and the end caps are rigid. On each side, an optical cylinder 124 is axially sandwiched between the end cap 214 and the piston 172. At each end of the optical cylinder a flexible gasket creates the interface between the optical cylinder and the end caps. The amount of squeeze in the gasket can be adjusted though choosing the length of the support arm, the length of the optical cylinder, and the thickness of the gasket. Furthermore, the optical cylinder is radially constrained by the O-Ring seals at each end. The O-ring seals also create a liquid tight seal at each end of the optical cylinder.

The optical devices 126 are mounted directly onto the support arms 440 and 442. Such an arrangement ensures rigid positioning of the two optical devices with respect to each other. Additionally, since the optical cylinders 124 are supported by all non-rigid connections, they are isolated from any bending loads caused by the dynamic forces in service. The aforementioned loads are transferred through the rigid connections of the support arms.

Figure 19:
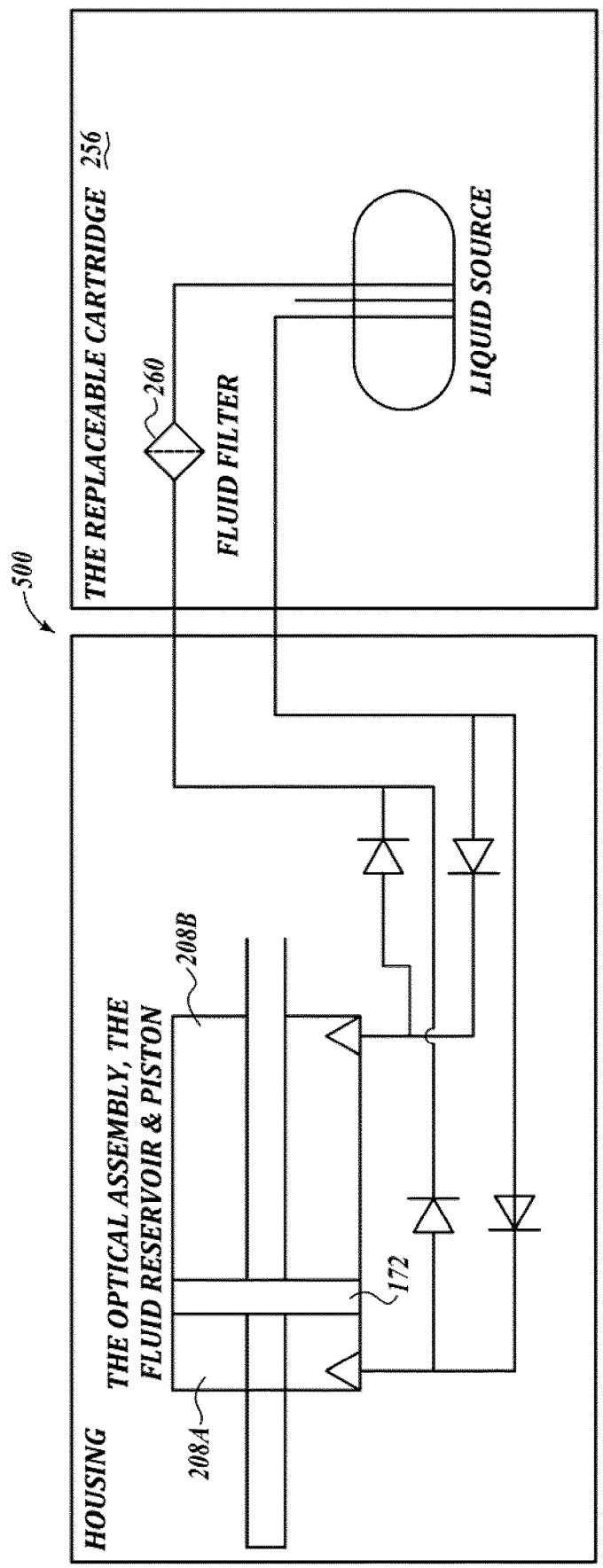
FIG. 19 is a schematic diagram of a liquid circuit formed in accordance with an aspect of the present disclosure.

The cleaning cycle for this embodiment involves the relative movement of the optical cylinder assembly with respect to the fluid cylinder 158. During such movement the liquid tight piston 172 causes fluid flow in and out of the respective ports. This flow can be used in very much the same way as explained in the fluid circuit of FIG. 5. However, two additional check valves can be used in this embodiment, and arrangement as shown in fluid circuit 500 of FIG. 19.

Figure 20:
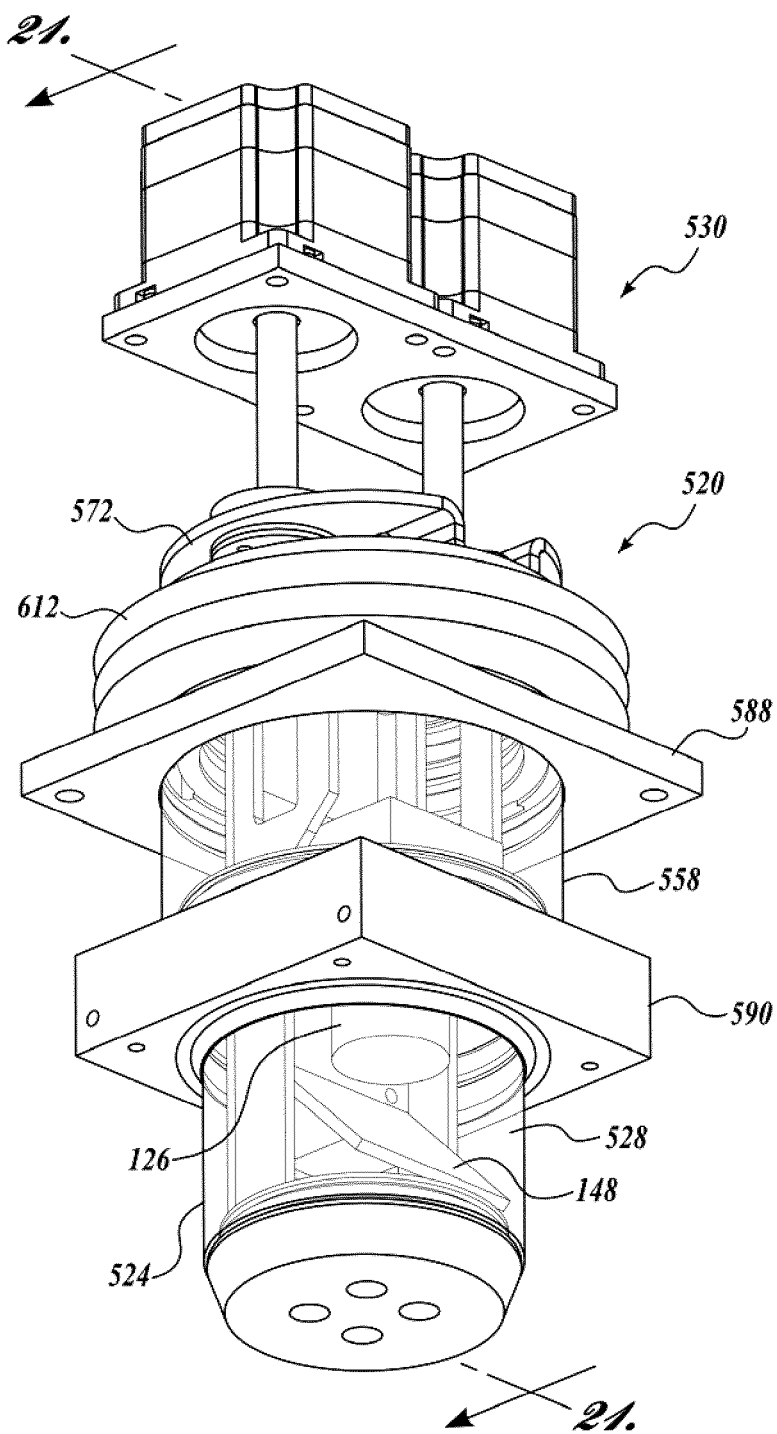
FIG. 20 is a perspective view of another representative embodiment of an optical assembly in accordance with an aspect of the present disclosure.
Figure 21:
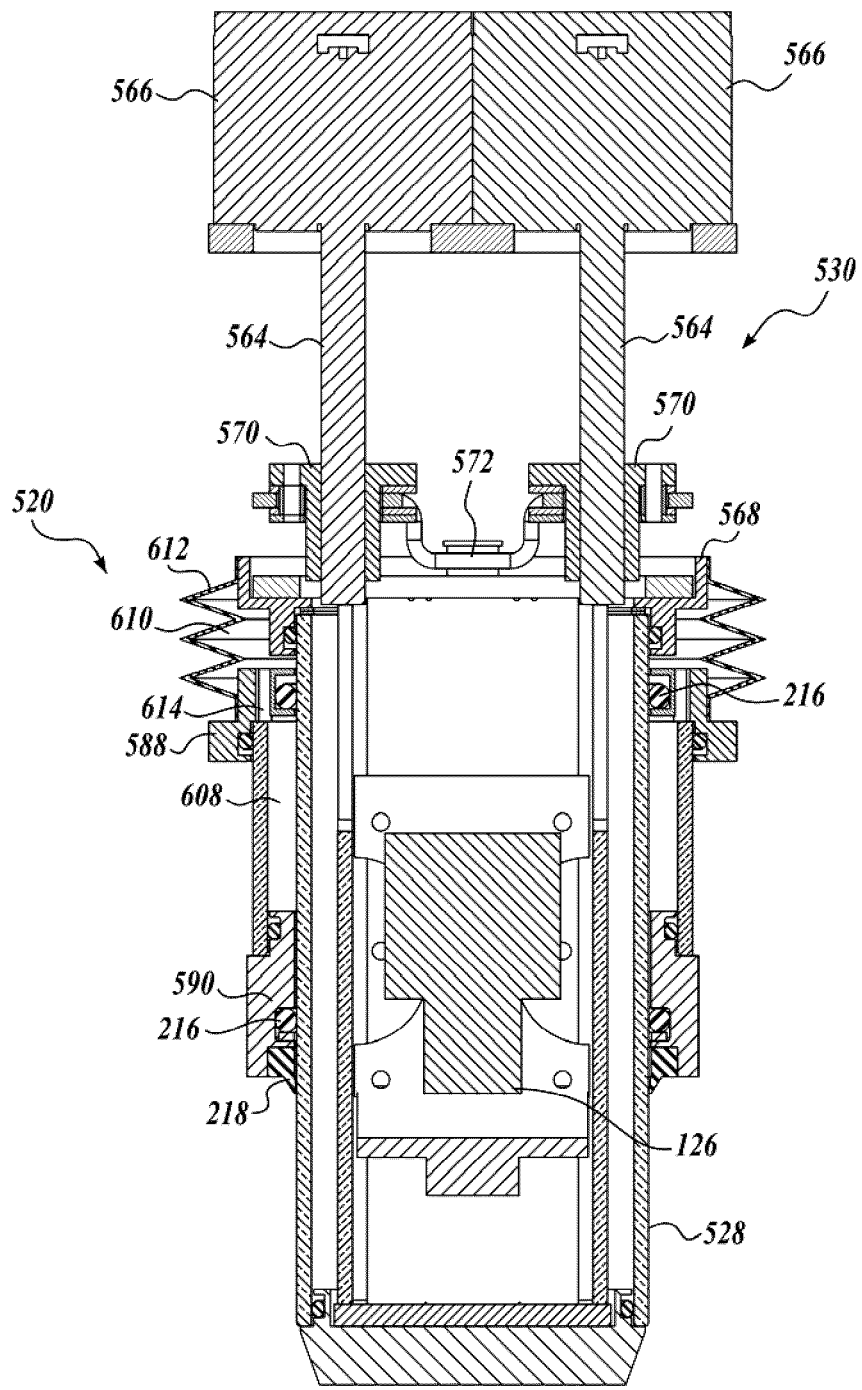
FIG. 21 is a cross-section view of the optical assembly of FIG. 20 in the home position.
Figure 22:
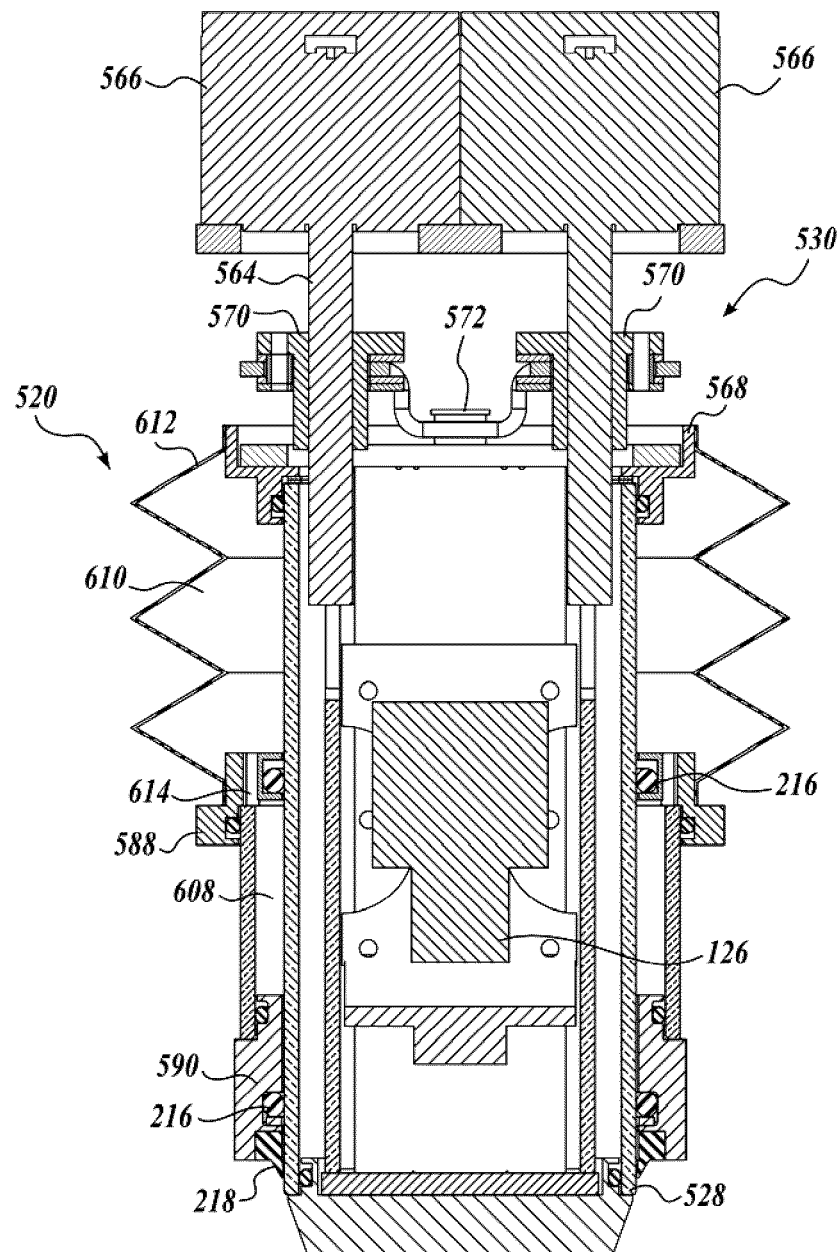
FIG. 22 is a cross-section view of the optical assembly of FIG. 20 in the retracted position.

FIG. 20 illustrates another embodiment of an optical assembly 520 formed in accordance with an aspect of the present disclosure. The optical assembly 520 is substantially similar in construction and operation as the optical assembly 120 described above except for the differences that will be explain in more detail below. As shown in FIGS. 20-22, the optical assembly 520 includes a driving mechanism 530 in the form of dual lead screws that provide reciprocating motion to an optical cylinder 524 with respect to an outer fluid cylinder 558.

Disposed within or otherwise protected by the optical cylinder 524 is at least one optical device 126. The optical device 126 has a line of sight in the radial direction of the optical cylinder 524 via a 45 degree mirror 148 or other reflective medium, through an optical window 128. In use, the optical window 128 can be aligned with an opening of an optional housing (not shown) when the optical cylinder 524 is in its home position of FIGS. 20 and 21.

As shown in FIG. 21, a first optical cylinder end cap 568 seals one end of the optical cylinder 524 with the aid of a suitable sealing means, such as an O-ring, heat bonding, chemical bonding, etc. A second, tapered end optical cylinder end cap seals the other end of the optical cylinder 524 with the aid of a suitable sealing means, such as an O-ring, heat bonding, chemical bonding, etc. In some embodiments, the first and second end caps are fixed to a support arm assembly. In some of these embodiments, flexible gaskets sandwiched between the end caps and the optical cylinder can provide damping and thermal strain relief, if desired. The lead screws 564 extend inwardly into the optical cylinder 524 on the sides thereof. Optional sensors (not shown) may be provided to detect the ends of the lead screws. In one embodiment, the output of the sensors is used by at least one of the one or more controllers 40 as a positional reference when actuating the optical cylinder 524. Alternatively, full retraction of the lead screws can be sensed by optional sensors fixed to the motor mounting plate. Engaged with the lead screws 564 are lead screw nuts 570. The lead screw nuts 570 are rotationally fixed to a mounting bracket 572, which is attached to the optical cylinder end cap 568 via a flexible coupling.

In operation, rotation of the lead screws 564 in both clockwise and counterclockwise directions via electric motors 566 causes the lead screw nuts 570, and in turn, the optical cylinder 524 to reciprocate within the fluid cylinder 558 between the positions shown, for example, in FIGS. 21 and 22. Similar to the optical assembly 120, it will be appreciated that the electric motors 566 can be controlled via suitable drive signals in order to move the optical cylinder 524 through one complete cycle (i.e., first or home position of FIG. 21, retracted or cleaning position of FIG. 22, first or home position of FIG. 21). While the driving mechanism 530 in the embodiment shown imparts movement to the optical cylinder 524, the driving mechanism 530 can be configured to impart movement to the fluid cylinder 558 instead.

Referring again to FIGS. 20-22, at least a portion of the optical cylinder 524 reciprocates within the fluid cylinder 558. As shown in FIGS. 20-22, upper and lower glands 588 and 590 are sealably mounted to the ends of the fluid cylinder 558. Each gland 588 and 590 surrounds the optical cylinder 524 and allows the optical cylinder 524 to reciprocate therethrough. In the embodiment shown in FIGS. 21 and 22, the glands 588 and 590 define inner bores through which the optical cylinder 524 reciprocally moves in a guiding manner. When assembled, the optical cylinder 524, the fluid cylinder 558, and the glands 588, 590 cooperate to define a fluid chamber 608. In particular, the fluid chamber 608 is formed between the outer surface of the optical cylinder 524 and the inner surface of the fluid cylinder 558. In some embodiments, the lower gland 590 includes an inlet (not shown in FIGS. 21-22) for accessing the fluid chamber 608.

Still referring to FIGS. 21-22, the upper and lower glands 588 and 590 each include a primary seal 216 configured and arranged to seal the fluid chamber 608. In the embodiment shown, the sealing action occurs between the exterior surface of the optical cylinder 524 and the inner bore surface of the glands 588, 590. In some embodiments, the primary seal 216 is compressed between the exterior surface of the optical cylinder 524 and the inner bore surface of the glands 588, 590. It will be appreciated that the primary seals 216 can have different configurations. For example, the lower primary seal may be configured for its fluid film application properties while the upper primary seal may be configured for its low friction in reciprocating motion.

In use, the fluid chamber 608 stores a quantity of non-stick liquid. While the lower primary seal 216 seals the fluid chamber 608, the lower primary seal 216 also aids in the application or maintenance of a layer of fluid covering at least the optical window 528. Thus, when the optical cylinder 524 is reciprocally moved with respect to the fluid cylinder 558, at least the optical window of the optical cylinder 524 comes into fluid contact with the liquid disposed therein. When the optical window is reciprocally moved in the opposite direction so as to remove the optical window from fluid contact within the fluid chamber 608, the lower primary seal 216 aids in the formation of a thin layer of non-stick liquid that remains on the optical window as the optical cylinder 524 returns to its home position of FIGS. 20 and 21. As such, at least the fluid chamber 608 and the lower primary seal 216 together form an embodiment of the fluid dispensing mechanism 36.

Still referring to FIGS. 21-22, the lower gland 590 further includes a secondary seal 218 disposed between the exterior surface of the optical cylinder 524 and the inner bore surface of the gland 590. The secondary seal 218 is positioned closer to the free end of the optical cylinder 524 than the primary seal 216. The secondary seal 218 is again configured with a sharp edge and tapers at an acute angle inwardly toward the optical cylinder 524 in some embodiments. The secondary seal 218 is further configured and arranged such that its outermost edge is flush against and exerts a positive pressure against the optical cylinder 524. As such, the secondary seal 218 is configured to scrape and/or wipe away contaminants rather than to seal fluids, and therefore, can also be referred to herein as a wiping element or wiper ("wiper 218"). The wiper 218 also forms an embodiment of the optical body cleaning mechanism 32.

Figure 23:
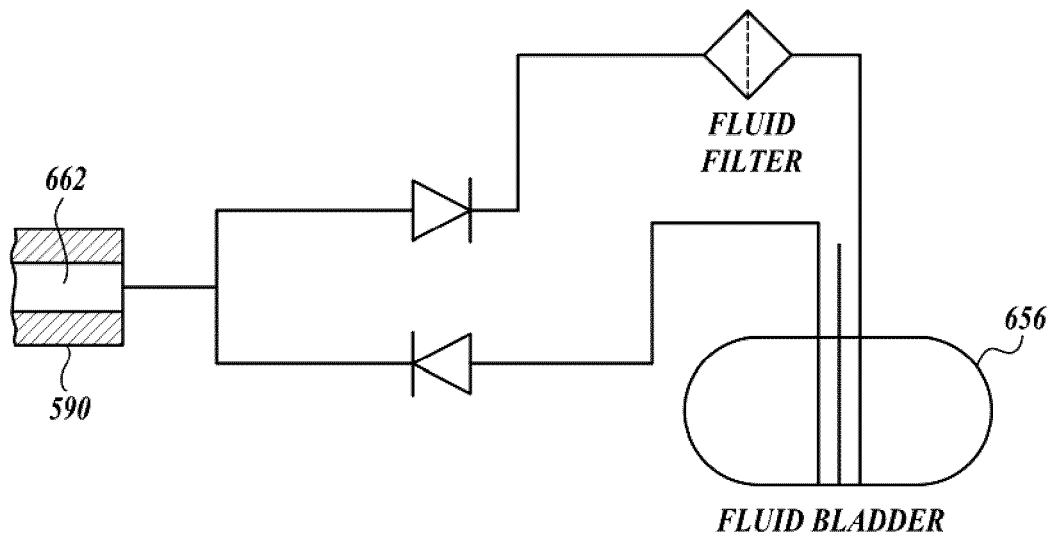
FIG. 23 is a schematic diagram of another fluid circuit formed in accordance with an aspect of the present disclosure.

In the embodiment shown, the fluid chamber 608 can be connected to an internal cavity 610 formed by an optional impermeable bellows 612. In the embodiment shown, the bellows 612 at one end is sealed against upper gland 588 and at the other end is sealed against the cap 568. This arrangement allows for extension and compression of the bellows 512 upon movement of the optical cylinder 524 with respect to the fluid chamber 608 and vice versa. In this embodiment, the upper gland 588 is formed with multiple channels 614, which are configured to allow fluid to flow between the internal cavity 610 of the bellows 612 and the fluid chamber 608. Of course, channels 614 are omitted in embodiments without the bellows 612. The bottom gland 590 in this and other embodiments is connected to a fluid bladder 656 via an inlet 662, as shown in the fluid circuit of FIG. 23. The fluid bladder 656, or other fluid reservoir, stores excess fluid, and if desired, is connected to the inlet 662 through an optional filter medium as well as one or more directional valves (e.g., umbrella valves, check valves, etc.).

In operation, as the optical cylinder translates from the position of FIG. 21 to the position of FIG. 22, the bellows 612 expands causing the pressure to decrease within the internal cavity 610 and fluid chamber 608 and the liquid to be drawn into the fluid chamber 608 from the fluid bladder 656. As the optical cylinder 524 translates from the position of FIG. 22 to the position of FIG. 21, the bellows 612 compresses causing the pressure to increase in the internal cavity 610 and fluid chamber 608 and the fluid to be pumped from the fluid chamber 608 into the bladder 656 through the optional filter via the inlet 662. It will be appreciated that the addition of the bellows 612 and the fluid bladder 656 demands less actuation force than embodiments with a liquid tight piston, enabling faster cleaning cycles in a smaller or similar package.

It should be appreciated that this design provides flow of fluid around the primary seal 216, which provides two distinct benefits: (1) it prevents fluid starvation of the primary seal even when the device is used in odd orientations; (2) it agitates any contamination which may have precipitated on the primary seal. This ensures that during the action of filtering, the contaminants are floating and are pumped through the filtering medium.

In some embodiments, it may be desirable to decouple the amount of stroke for cleaning the optical window with the stroke used for pumping the liquid. In these embodiments, the connection of the bellows to the optical cylinder end cap can be eliminated. The bellows can instead be complemented with another smaller-diameter internal bellows. In this embodiment, the two bellows would be sealed at the top, while at the bottom they would be connected to the top primary seal gland, with the fluid channels lying in-between them. An internal compression spring can erect the two connected bellows. Upon extension, the optical cylinder end cap pushes and compresses this collapsible tank pumping the liquid out, while during retraction the internal compression spring will re-erect the two bellows, thereby drawing the liquid back in. In this embodiment, the stroke for pumping can be smaller than the cleaning action stroke.

As described above, in some applications, having a pair of optical devices is beneficial or advantageous. An example of such application is a stereo camera which enables calculation of depth information in addition to the camera view. This example can be implemented in many different configurations. For example, an optical assembly according to another embodiment integrates two optical devices, such as optical assemblies 520, into one longer optical cylinder. In another embodiment, the two bellows can be replaced with a shared or two connected bellows. In this embodiment, the fluid ports can be chosen to be in the bellow(s) or embedded in either of the glands.

Figure 24:
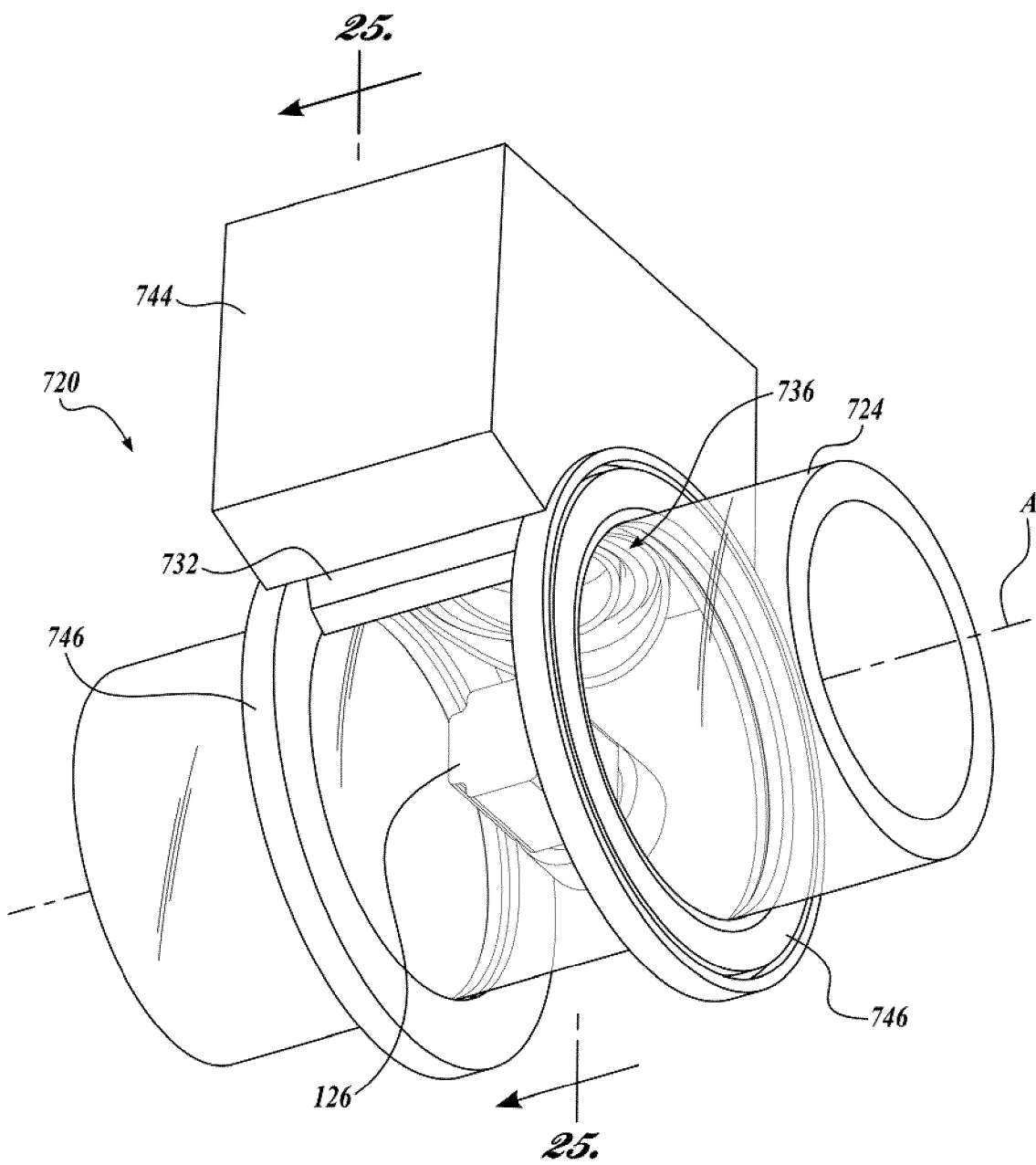
FIG. 24 is a perspective view of another embodiment of an optical assembly in accordance with an aspect of the present disclosure.
Figure 25:
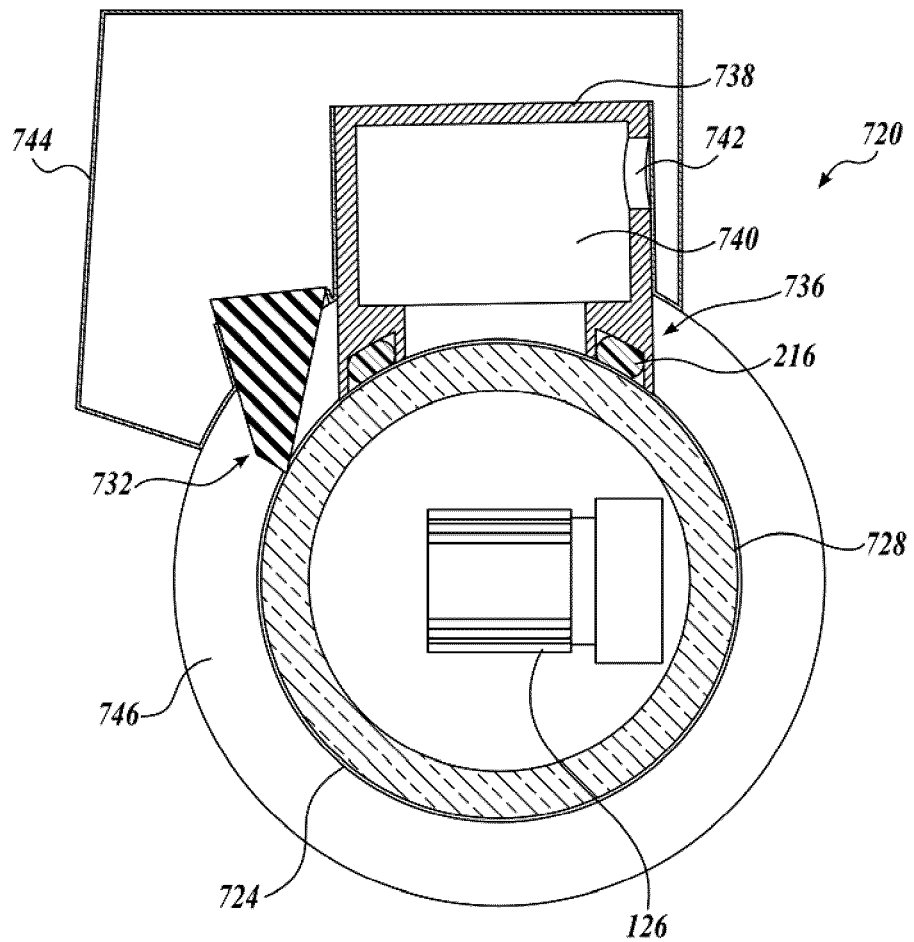
FIG. 25 is a cross section view of the optical assembly of FIG. 24.

FIGS. 24 and 25 illustrate another embodiment of an optical assembly 720 formed in accordance with an aspect of the present disclosure. FIG. 24 is a perspective view of the optical assembly 720. FIG. 25 is a cross section view of the optical assembly 720 of FIG. 24. As shown in FIGS. 24 and 25, the optical assembly 720 includes an optical body 724, a fluid applicator 736, and an optical body cleaning mechanism 732. In the embodiment shown, the optical body 724 is formed as an optical cylinder that houses one or more optical devices 126 therein. In this embodiment, the optical cylinder 724 is rotated by a suitably configured and arranged drive mechanism (not shown) about a central axis A so that the optical window is moved with respect to both the fluid applicator 736 and an optical body cleaning mechanism 732. Rotation in some embodiments can be in only a single direction, while rotation in other embodiments includes reciprocating rotation or angular oscillation.

The fluid applicator 736 in this embodiment includes an open ended housing 738. The housing 738 includes a fluid chamber 740 in fluid communication with an opening defined by the housing 738. The open end of the housing 738 is configured to be flush against the optical body 724 and includes a groove disposed around the perimeter of the opening. The groove is configured to receive the primary seal 216. An optional inlet 742 is provided in the housing 738 for accessing the fluid chamber 740.

The optical body cleaning mechanism 732 is again formed as a wiper, which is configured with a sharp edge and tapers at an acute angle inwardly toward the outer surface of the optical cylinder 724. The wiper is further configured and arranged such that its outermost edge is flush against and exerts a positive pressure against the outer surface of optical cylinder 724. In some embodiments, the wiper is fabricated out of an elastomer having a hardness value similar to the primary seal 216. In other embodiments, the wiper is fabricated out of an elastomer having a hardness value greater than the primary seal 216. In one embodiment, the wiper has a Shore A hardness in the range of about 85-95.

In the embodiment shown in FIGS. 24-25, the wiper does not enclose the fluid applicator, and as such, it is possible for contaminants to enter the space between the wiper and the fluid applicator, bypassing the wiper and coming into contact with the fluid applicator. To prevent such a scenario, the space between the wiper and the fluid applicator may be optionally enclosed, and completely sealed in some embodiments. In that regard, the optical assembly 720 includes an optional enclosure 744. In the embodiment shown, the wiper is mounted to the enclosure 744, which is configured to also act as a scraper of foreign material.

In some embodiments, partial or fully circular seal plates 746 are provided between the enclosure 744 and the optical body 724. In that regard, first and second seal plates 746 are disposed on each side of the wiper. In some embodiments, the first and second seal plates 746 are fixed to the optical body 724. In these embodiments, fixation can be accomplished through adhesives, one or more O-rings, etc. The interface between the seal plates 746 and the enclosure 744 can be that of between two rigid materials similar to the one found in a bushing. In some embodiments, the material of the enclosure as well as the seal plates can be chosen to result in a low friction interface.

In other embodiments, the first and second seal plates 746 are fixed to the enclosure 744. In these embodiments, the interface between the seal plates 746 and the optical cylinder 724 behave similar to a rotary seal. In that regard, suitable seals used for rotary dynamic sealing, such as shaft oil seals and bearing isolators, can be employed. Some examples of such seals are "FlexiCase™ CEE", "FlexiSeal FF", and "FlexiLip Rotary" by Parker Hannifin Corp. In yet other embodiments, each seal plate can consist of two interleaving plates, namely outer and inner seal plates. In these embodiments, the outer plate is fixed to the enclosure 744 and the inner plate fixed to the optical body 724. It will be appreciated that other labyrinth-style seal geometries such as those used as bearing isolators would also be effective in these embodiments. Examples that may be practiced with embodiments of the present disclosure are offered by Parker family of ProTech™ bearing isolators.

Figure 26:
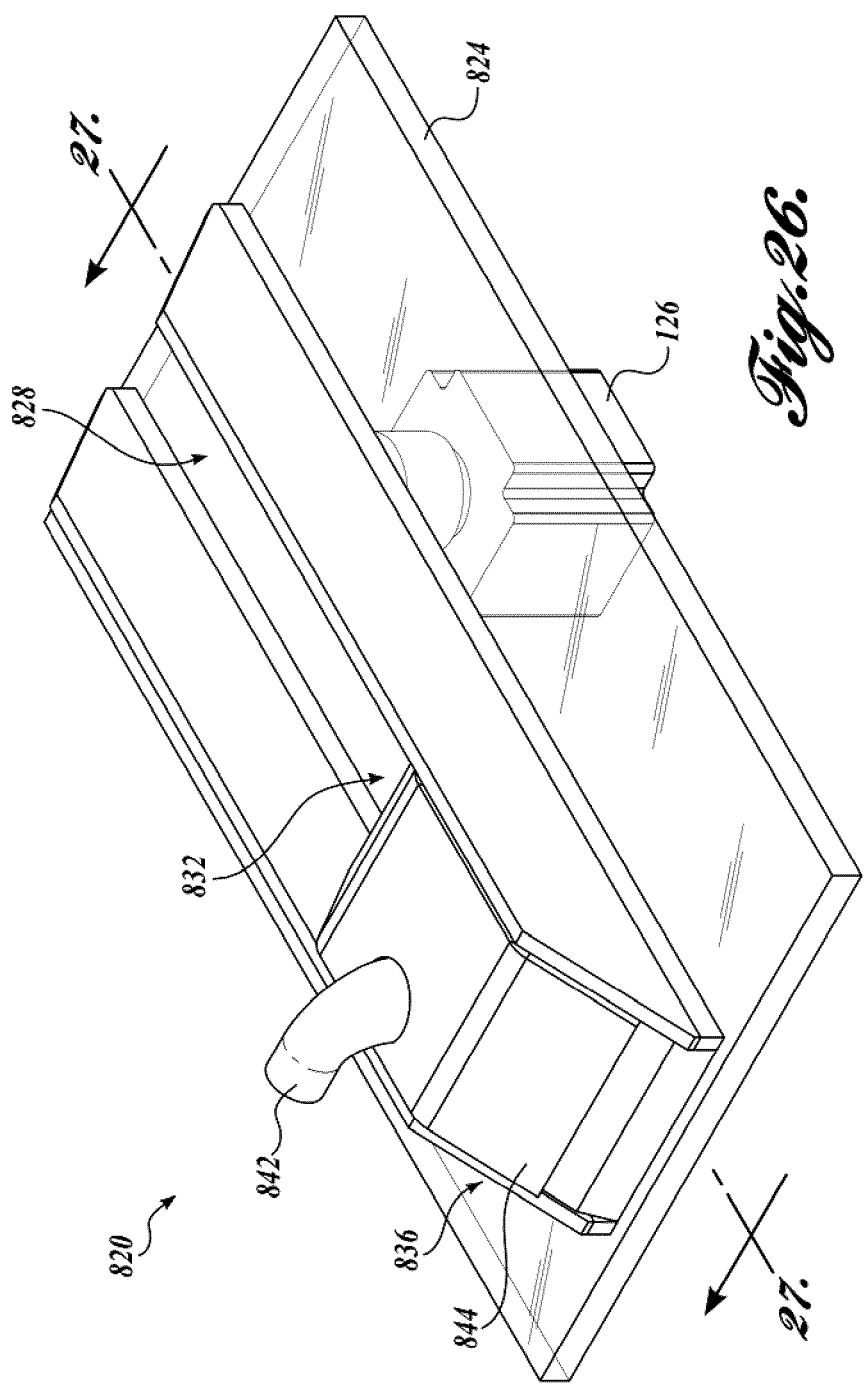
FIG. 26 is a perspective view of yet another embodiment of an optical assembly in accordance with an aspect of the present disclosure.
Figure 27:
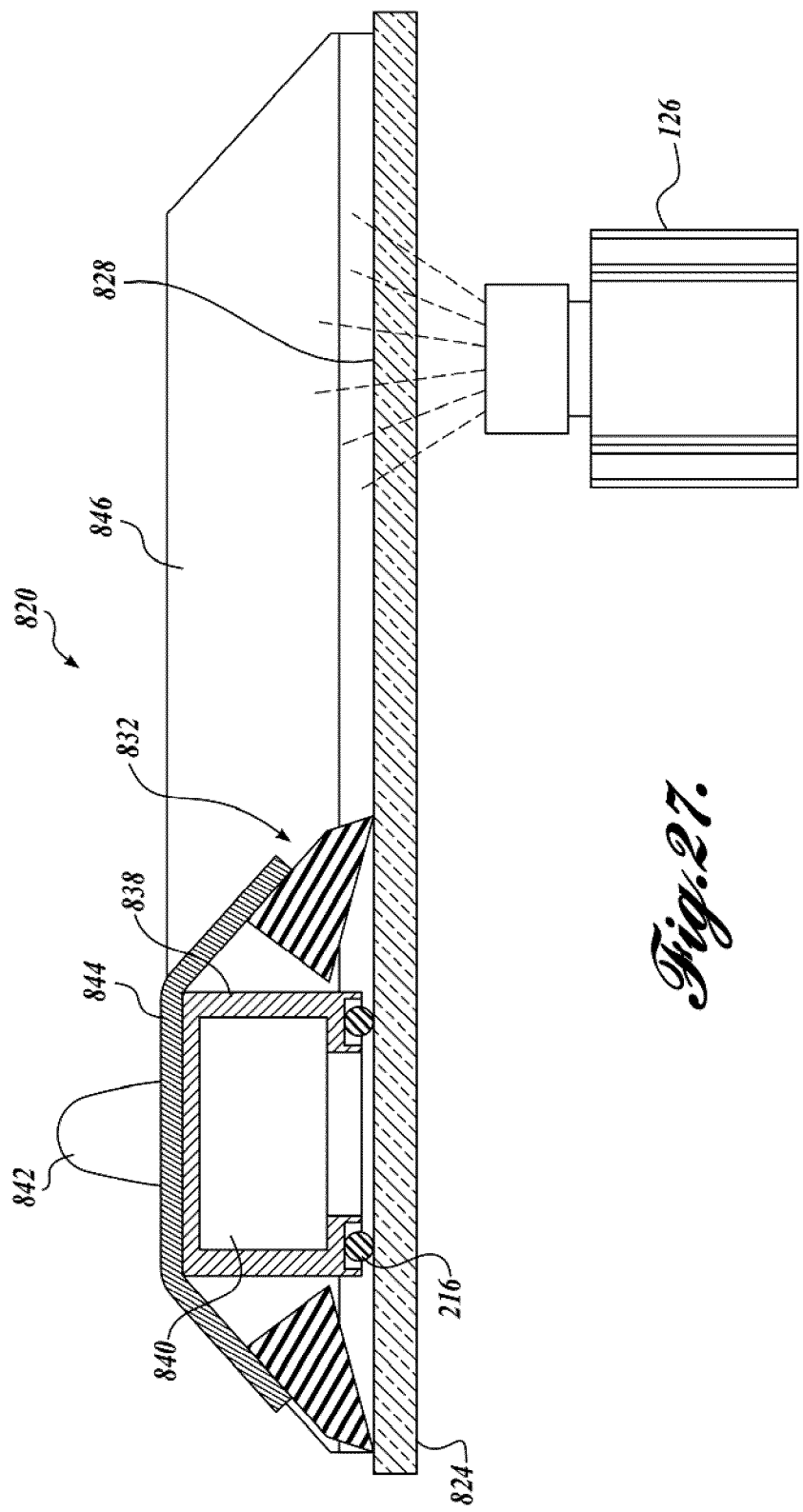
FIG. 27 is a cross section view of the optical assembly of FIG. 26.

FIGS. 26 and 27 illustrate another embodiment of an optical assembly 820 formed in accordance with an aspect of the present disclosure. FIG. 26 is a perspective view of the optical assembly 820. FIG. 27 is a cross section view of the optical assembly 820 of FIG. 26. The optical assembly 820 is substantially identical to the optical assembly 720 in construction and operation except for the differences that will now be described. As shown in FIGS. 26 and 27, the optical assembly 820 includes an optical body 824, a fluid applicator 836, and an optical body cleaning mechanism 832. In the embodiment shown, the optical body 824 is formed as an optical plate having a planar optical surface. The optical body protects one or more optical devices 126. In this embodiment, the optical plate is linearly reciprocated by a suitably configured and arranged drive mechanism (not shown) so that the optical window 828 is moved with respect to both the fluid applicator 836 and an optical body cleaning mechanism 832.

The fluid applicator 836 in this embodiment also includes an open ended housing 838. The housing 838 includes a fluid chamber 840 in fluid communication with an opening defined by the housing 838. The open end of the housing is configured to be flush against the optical body 824 and includes a groove disposed around the perimeter of the opening that is configured to receive the primary seal 216. An optional inlet 842 is provided in the housing 838 for accessing the fluid chamber 840.

The optical body cleaning mechanism 832 is again formed as a wiper or scraper, which is configured with a sharp edge and tapers at an acute angle inwardly toward the outer surface of the optical cylinder 824. Again, the wiper is further configured and arranged such that its outermost edge is flush against and exerts a positive pressure against the outer surface of optical cylinder 824.

The optical assembly 820 also includes an optional enclosure 844. In the embodiment shown, the wiper is mounted to the enclosure 844. In some embodiments, parallely extending seal plates 846 are provided on each side of the wiper between the enclosure 844 and the optical body 824. At the end of each seal plate 844 there is provided a lip-type seal for interfacing with the optical body 824. It will be appreciated that labyrinth-style seal geometries would also be effective in these embodiments.

Figure 28:
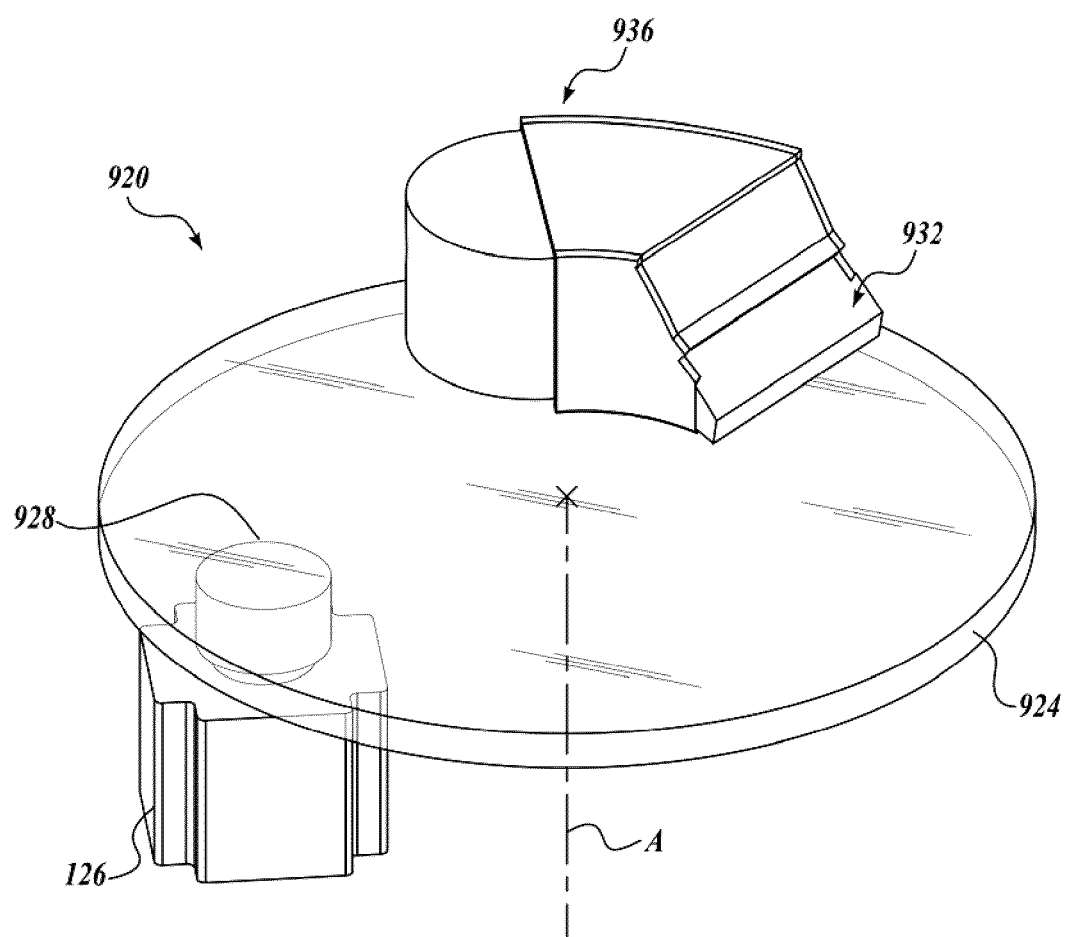
FIG. 28 is a perspective view of still another embodiment of an optical assembly in accordance with an aspect of the present disclosure.
Figure 29:
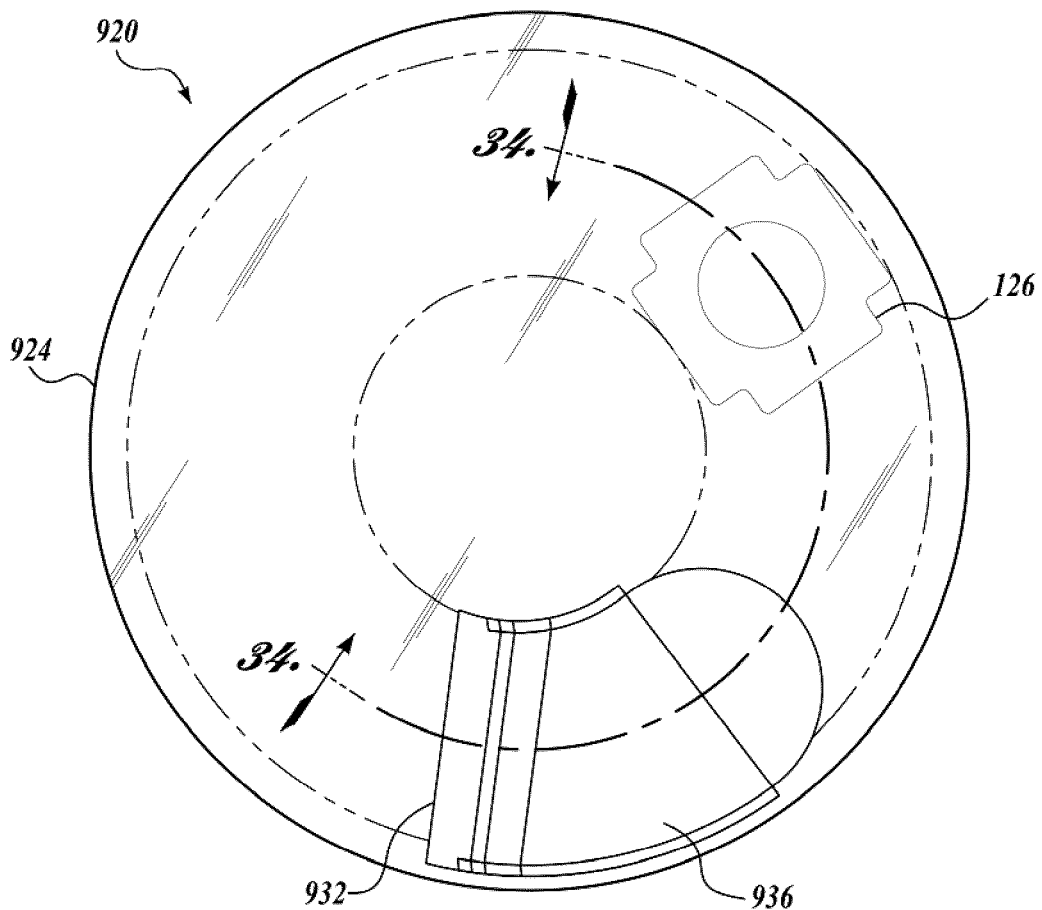
FIG. 29 is a top view of the optical assembly of FIG. 28.
Figure 30:
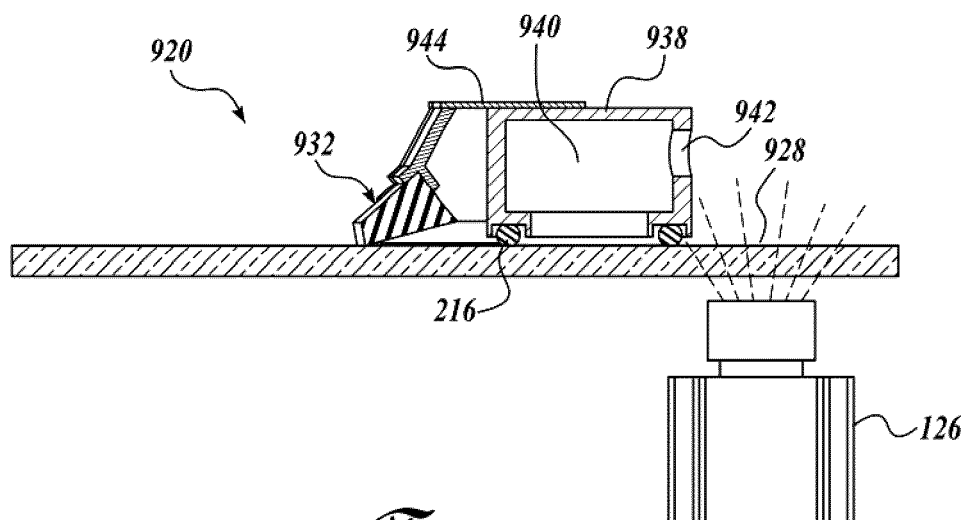
FIG. 30 is a cross section view of the optical assembly of FIG. 29.

FIGS. 28-30 illustrate another embodiment of an optical assembly 920 formed in accordance with an aspect of the present disclosure. FIG. 28 is a perspective view of the optical assembly 920. FIG. 29 is a top view of the optical assembly of FIG. 28. FIG. 30 is a cross section view of the optical assembly 920 of FIG. 29. The optical assembly 920 is substantially identical to the optical assemblies 720 and 820 in construction and operation except for the differences that will now be described. As shown in FIGS. 28-30, the optical assembly 820 includes an optical body 924, a fluid applicator 936, and an optical body cleaning mechanism 932. In the embodiment shown, the optical body 924 is formed as an optical disc plate having a planar optical surface. The optical body shields or protects one or more optical devices 126. In this embodiment, the optical disc plate is rotated about an axis A by a suitably configured and arranged drive mechanism (not shown) so that the optical window 928 is moved with respect to both the fluid applicator 936 and an optical body cleaning mechanism 932. Rotation in some embodiments can be in only a single direction, while rotation in other embodiments includes reciprocating rotation or angular oscillation.

The fluid applicator 936 in this embodiment also includes an open ended housing 938. The housing 938 includes a fluid chamber 940 in fluid communication with an opening defined by the housing 938. The open end of the housing 938 is configured to be flush against the optical body 924 and includes a groove disposed around the perimeter of the opening that is configured to receive the primary seal 216. An optional inlet 942 is provided in the housing 938 for accessing the fluid chamber 940.

The optical body cleaning mechanism 932 is again formed as a wiper or scraper, which is configured with a sharp edge and tapers at an acute angle inwardly toward the outer surface of the optical body 924. Again, the wiper is further configured and arranged such that its outermost edge is flush against and exerts a positive pressure against the outer surface of optical body 924.

Figure 31:
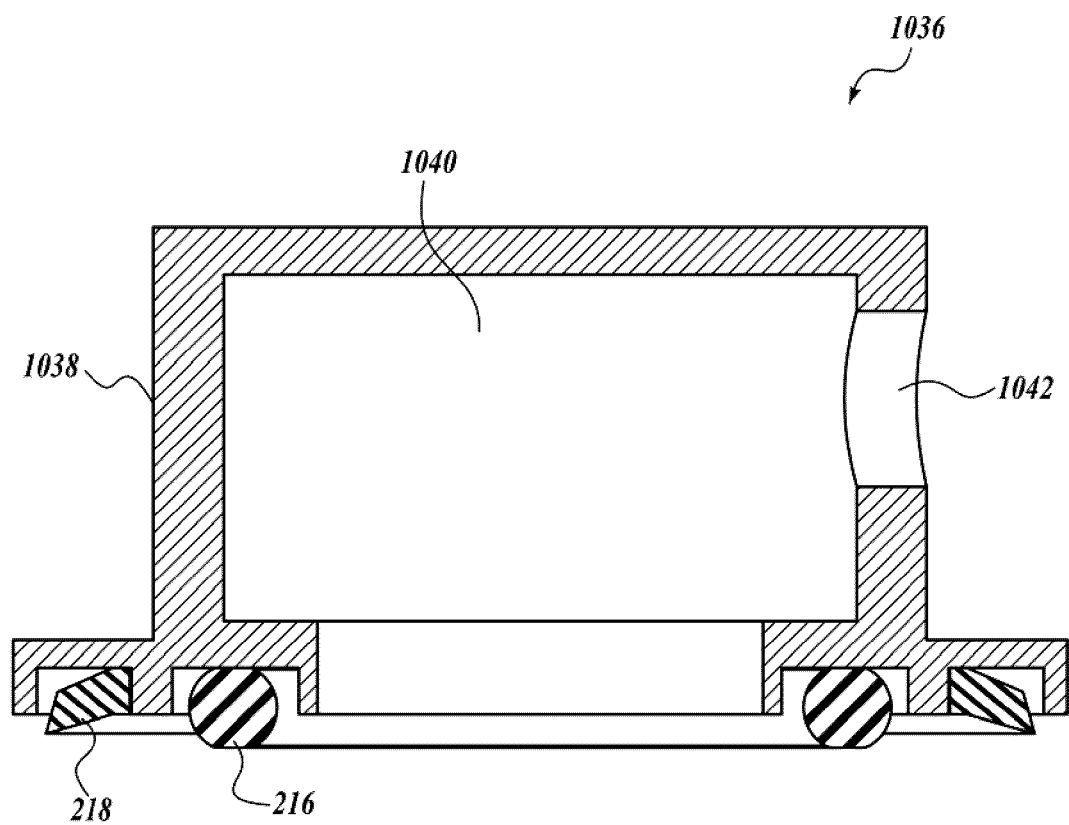
FIG. 31 is an embodiment of an integrated fluid applicator and wiper in accordance with aspects of the present disclosure.

In some embodiments, the optical assembly 920 also includes an optional enclosure 944. In the embodiment shown, the wiper is mounted to the enclosure 944. In some embodiments, the enclosure 944 forms a sealing interface with the optical body 924 via a lip-type seal or the like. In other embodiments, an integrated fluid applicator and wiper (See FIG. 31) can be employed. The integrated fluid applicator and wiper of FIG. 31 can also be employed in other embodiments of the optical assembly described above.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for cleaning an optical window protecting an optical device, the method comprising:
    in response to at least one control signal provided by one or more controllers:
        causing relative movement between the optical window and a wiper;
        cleaning a portion of the optical window with the wiper; and
        applying liquid film to at least a part of the portion of the optical window cleaned by the wiper, the liquid film remaining on the at least the part of the portion of the optical window and permitting optical operation of the optical device covered by the at least the part of the portion of the optical window while impeding adhesion of contaminants to a surface of the at least the part of the portion of the optical window underlying the liquid film.

2. The method of claim 1, wherein a surface of the portion of the optical window is covered by an enclosure after the surface has been cleaned and before the liquid film is applied to the surface.

3. The method of claim 1, wherein applying the liquid film comprises applying the liquid film only to a surface of the optical window cleaned with the wiper.

4. The method of claim 1, wherein the liquid film is applied from a fluid chamber by a seal acting as a dispenser for applying the liquid film.

5. The method of claim 4, wherein the seal is compressed between a surface of the optical window and the fluid chamber.

6. The method of claim 4, further comprising controlling with the seal a thickness of the liquid film applied to the at least the part of the portion of the optical window.

7. The method of claim 1, wherein causing the relative movement between the optical window and the wiper comprises causing one of a linear movement or rotational movement.

8. The method of claim 7, wherein causing the relative movement between the optical window and the wiper comprises causing the relative movement with a motor.

9. The method of claim 1, wherein causing the relative movement comprises causing a rotational movement, and wherein the method further comprises rotating the optical window to position the at least the part of the portion of the optical window to which the liquid film has been applied over the optical device or rotating the wiper to expose the at least the part of the portion of the optical window to which the liquid film has been applied.

10. The method of claim 1, wherein the method further comprises causing the relative movement in a first direction during the cleaning and causing the relative movement in a second direction opposite the first direction during the applying.

11. The method of claim 1, further comprising detecting presence of contaminants on the optical window.

12. The method of claim 11, further comprising cleaning the portion of the optical window and applying the liquid film to the at least the part of the portion of the optical window responsive to detecting the presence of contaminants on the optical window or elapse of a period of time.

13. The method of claim 1, further comprising replenishing liquid for applying the liquid film, the liquid stored in a fluid chamber.

14. The method of claim 13, further comprising filtering the liquid to remove contaminants from the liquid.

15. The method of claim 1, wherein the liquid film is made of liquid that weakens a bond between contaminants and the optical window to facilitate removal of the contaminants during the cleaning.

16. The method of claim 1, wherein the liquid film is made of liquid that is not repelled by a surface of the optical window.

17. The method of claim 1, wherein the liquid film is made of hydraulic oil or silicone oil.

18. The method of claim 1, wherein the wiper is positioned stationary relative to a fluid applicator configured to apply the liquid film.

* * * * *